US011967245B2

United States Patent
Hashimoto et al.

(10) Patent No.: US 11,967,245 B2
(45) Date of Patent: Apr. 23, 2024

(54) TRAINING PROCESSING DEVICE, INTERMEDIATION DEVICE, TRAINING SYSTEM, AND TRAINING PROCESSING METHOD

(71) Applicant: KAWASAKI JUKOGYO KABUSHIKI KAISHA, Hyogo (JP)

(72) Inventors: Yasuhiko Hashimoto, Kobe (JP); Masayuki Kamon, Akashi (JP); Shigetsugu Tanaka, Akashi (JP); Yoshihiko Maruyama, Osaka (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 635 days.

(21) Appl. No.: 17/267,343

(22) PCT Filed: Aug. 8, 2019

(86) PCT No.: PCT/JP2019/031522
§ 371 (c)(1),
(2) Date: Feb. 9, 2021

(87) PCT Pub. No.: WO2020/032218
PCT Pub. Date: Feb. 13, 2020

(65) Prior Publication Data
US 2021/0260753 A1    Aug. 26, 2021

(30) Foreign Application Priority Data

Aug. 10, 2018  (JP) ................................ 2018-151917
Jun. 5, 2019   (JP) ................................ 2019-105751

(51) Int. Cl.
*B25J 9/00*     (2006.01)
*A63F 13/25*    (2014.01)
(Continued)

(52) U.S. Cl.
CPC .............. *G09B 19/00* (2013.01); *A63F 13/25* (2014.09); *A63F 13/50* (2014.09); *A63F 13/67* (2014.09);
(Continued)

(58) Field of Classification Search
CPC ........ B25J 9/0081; B25J 9/1605; B25J 9/163; B25J 9/1671; B25J 13/06
See application file for complete search history.

(56) References Cited

U.S. PATENT DOCUMENTS 7,860,614 B1   12/2010 Reger
10,011,011 B2*  7/2018 Sugaya ................. G06F 3/0482
(Continued)

FOREIGN PATENT DOCUMENTS

CN     206224894 U    6/2017
JP     H06-039753 A   2/1994
(Continued)

*Primary Examiner* — Kira Nguyen
(74) *Attorney, Agent, or Firm* — Studebaker & Brackett PC

(57) ABSTRACT

A training processing device manages a training for a robot manipulation using a manipulation terminal. The training processing device communicates information with the manipulation terminal through a communication network, accepts first information that is information on the robot manipulation inputted into the manipulation terminal, while the manipulation terminal executing a computer program for the training of the robot manipulation, and manages the training based on the first information.

20 Claims, 16 Drawing Sheets

(51) Int. Cl.

| | |
|---|---|
| *A63F 13/50* | (2014.01) |
| *A63F 13/67* | (2014.01) |
| *B25J 9/16* | (2006.01) |
| *B25J 13/00* | (2006.01) |
| *B25J 13/02* | (2006.01) |
| *B25J 13/06* | (2006.01) |
| *B25J 13/08* | (2006.01) |
| *B25J 19/02* | (2006.01) |
| *G09B 19/00* | (2006.01) |

(52) U.S. Cl.
CPC ........... *B25J 9/0081* (2013.01); *B25J 9/1605* (2013.01); *B25J 9/161* (2013.01); *B25J 9/163* (2013.01); *B25J 9/1661* (2013.01); *B25J 9/1671* (2013.01); *B25J 9/1697* (2013.01); *B25J 13/006* (2013.01); *B25J 13/02* (2013.01); *B25J 13/06* (2013.01); *B25J 13/065* (2013.01); *B25J 13/082* (2013.01); *B25J 13/088* (2013.01); *B25J 19/021* (2013.01)

(56) References Cited

U.S. PATENT DOCUMENTS

| | | | |
|---|---|---|---|
| 10,926,408 | B1* | 2/2021 | Vogelsong ............... B25J 9/163 |
| 10,981,272 | B1* | 4/2021 | Nagarajan .............. B25J 9/1669 |
| 2012/0189996 | A1 | 7/2012 | Hager et al. |
| 2015/0161808 | A1 | 6/2015 | Oya et al. |
| 2016/0314717 | A1 | 10/2016 | Grubbs |
| 2017/0319282 | A1 | 11/2017 | Jarc et al. |
| 2018/0029232 | A1* | 2/2018 | Ouchi .................... B25J 9/1671 |
| 2018/0349527 | A1* | 12/2018 | Li ............................ G06N 3/08 |
| 2019/0084151 | A1* | 3/2019 | Bai ........................ B25J 9/1612 |
| 2020/0030979 | A1* | 1/2020 | Bank ........................ B25J 13/08 |

FOREIGN PATENT DOCUMENTS

| | | |
|---|---|---|
| JP | 2002-254373 A | 9/2002 |
| JP | 2006-133443 A | 5/2006 |
| JP | 2007-183332 A | 7/2007 |
| JP | 2011-125991 A | 6/2011 |
| JP | 2012-521568 A | 9/2012 |
| WO | 2013-0136930 A1 | 9/2013 |

\* cited by examiner

TRAINING PROCESSING DEVICE, INTERMEDIATION DEVICE, TRAINING SYSTEM, AND TRAINING PROCESSING METHOD

TECHNICAL FIELD

The present disclosure relates to a training processing device, an intermediation device, a training system, and a training processing method.

BACKGROUND ART

Conventionally, mobilization of works having been performed by humans has been progressed. When a robot is manipulated by a person, a training is needed for the manipulating person. For example, Patent Document 1 discloses a training device for manipulating a life-support robotic arm. This training device is implemented by a simulator which is executed on a computer device and imitates functions of the life-support robotic arm.

REFERENCE DOCUMENT OF CONVENTIONAL ART

Patent Document

[Patent Document 1] JP2011-125991A

DESCRIPTION OF THE DISCLOSURE

Problem(s) to be Solved by the Disclosure

In recent years, in the industries handling industrial robots, there is a concern about a lack of operators of the robots because of a declining birthrate and a growing proportion of elderly people. Meanwhile, for some reasons, the number of persons who cannot fully work or do not work increases. Manpower of such persons is precious.

Therefore, one purpose of the present disclosure is to provide a training processing device, an intermediation device, a training system, and a training processing method, which enable various persons to manipulate a robot by giving him/her a training of the manipulation of the robot.

SUMMARY OF THE DISCLOSURE

In order to achieve the purpose, a training processing device according to one aspect of the present disclosure manages a training for a robot manipulation using a manipulation terminal. The training processing device is adapted to communicate information with the manipulation terminal through a communication network, accept first information that is information on the robot manipulation inputted into the manipulation terminal, while the manipulation terminal executing a computer program for the training of the robot manipulation, and manage the training based on the first information.

Effect of the Disclosure

According to the present disclosure, various persons become able to manipulate a robot by receiving a training of the manipulation of the robot.

MODE FOR CARRYING OUT THE DISCLOSURE

Figure 1:
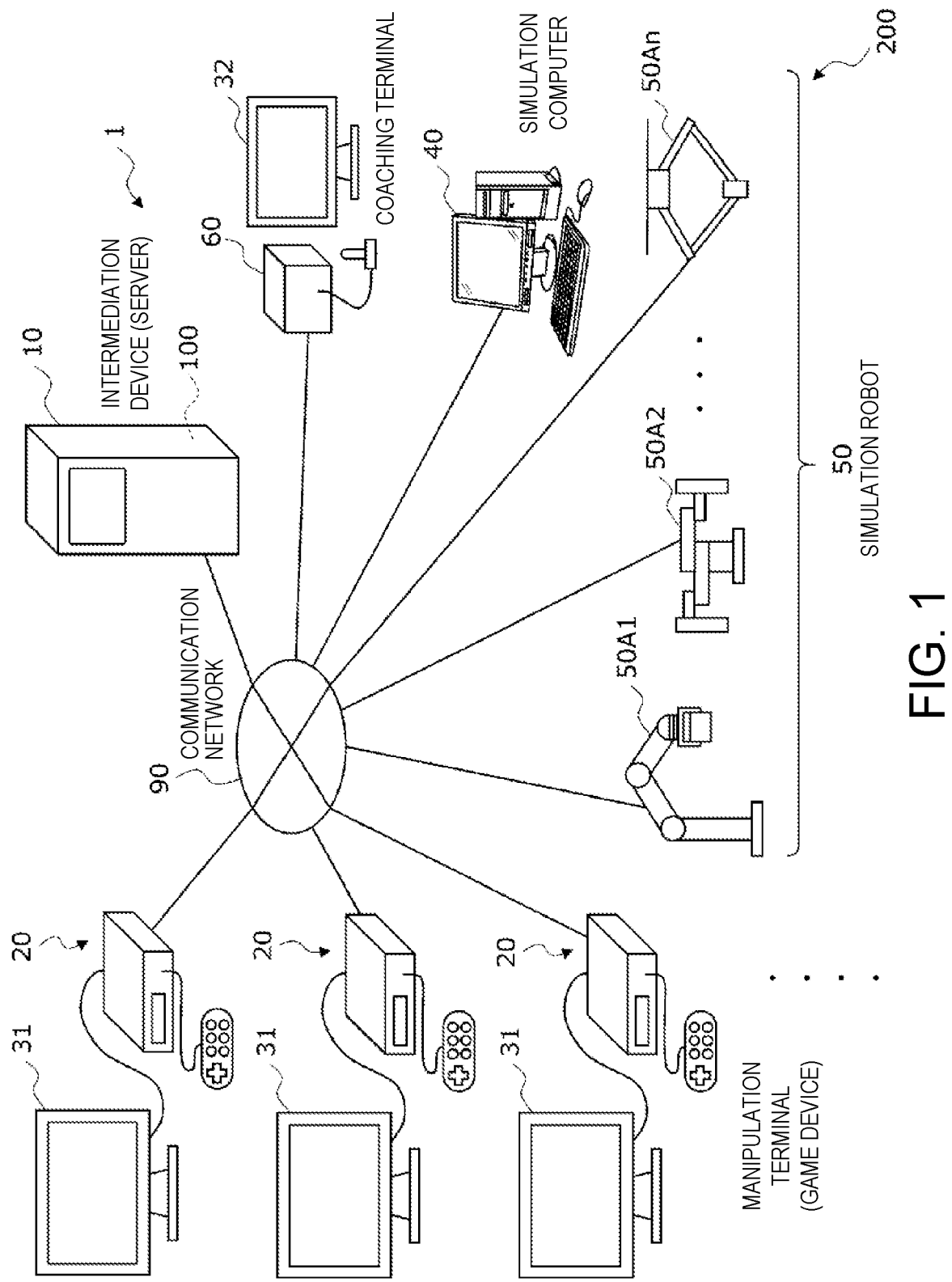
FIG. 1 is a view illustrating one example of a configuration of a training system according to one embodiment.

Hereinafter, embodiments of the present disclosure will be described with reference to the drawings. Note that the following embodiment describes a comprehensive or concrete example. Moreover, components which are not described in independent claims which are the broadest concept, among components in the following embodiment, are described as arbitrary components. Moreover, each of the accompanying drawings is a schematic drawing, and therefore, it is not intended to be illustrated strictly. Moreover, in each drawing, the same reference characters are assigned to substantially the same components, and redundant description may be omitted or simplified. Moreover, in this description and the appended claims, "device" does not only mean a single device, but it may also mean a system comprised of a plurality of devices.

<Configuration of Training System>

A configuration of a training system 1 according to this embodiment is described. FIG. 1 is a view illustrating one example of a configuration of the training system 1 according to this embodiment. As illustrated in FIG. 1, the training system 1 includes one or more intermediation devices 10, one or more manipulation terminals 20, and one or more coaching terminals 60. Moreover, the training system 1 may also include one or more simulation computers 40 and one or more simulation robots 50, and it includes these in this embodiment. The simulation computer 40 and the simulation robot 50 are examples of a simulation device 200. In the following, when not distinguishing the "simulation computer 40" from the "simulation robot 50," or vice versa, they may simply be referred to as the "simulation device 200." The intermediation device 10, the manipulation terminal 20, the simulation computer 40, the simulation robot 50, and the coaching terminal 60 are connected to each other through a communication network 90. Note that not all the components are essential.

The training system 1 allows a user to perform trainings of various robot manipulations using the manipulation terminal 20. The robot manipulation is a manipulation for operating the robot, and is a manipulation corresponding to operation of the robot. For example, during the training for the robot manipulation, the user operates the manipulation terminal 20 to cause a robot model to perform the content of the training for performing a given operation or work. The available robot model is an imaginary robot model which is generated by the manipulation terminal 20 executing a computer program, an imaginary robot model which is generated by the simulation computer 40, and a robot model using an actual robot provided to the simulation robot 50. Moreover, the training system 1 can assist the user's robot manipulation by using the coaching terminal 60 during the execution of the training The given operation is an operation including one or more individual operations of a horizontal movement, a vertical movement, a rotational movement, etc. The given work is a series of complex operations in which the individual operations more than the given operation are combined according to an order of execution. For example, in case of a robot model of an industrial robot, the given work is a work, such as moving an object while it is held by the end effector of the robot model, holding the object by the end effector and assembling it to an object to be assembled, cutting the object by the end effector, joining two or more objects by the end effector.

The communication network 90 is a network in which data communication is possible, and, for example, it may be an Internet, an intranet, a wired or wireless LAN (Local Area Network), a WAN (Wide Area Network), a mobile communication network, a telephone network, or other communication networks using wired or wireless communications. In this embodiment, the communication network 90 is the Internet.

The simulation computer 40 is a device for executing a simulation in which an imaginary robot model carries out a simulated operation. In the training system 1, it is possible to give a training for the robot manipulation by using the simulation of the simulation computer 40. The imaginary robot model is generated and runs on the computer program of the simulation computer 40. Note that the simulation computer 40 may or may not be a device produced especially for the training system 1, and, for example, it may be an existing or general-purpose device used for the simulation of the robot manipulation. The simulation computer 40 can realize a manipulation and an operation close to those of the actual robot by using the robot model closer to the actual robot than the robot model which is generated on the computer program by the manipulation terminal 20. The robot model of the simulation computer 40 may be an imaginary robot model of robots which are illustrated as actual robots 50A1-50An (n is a natural number (n=1, . . . )) of a simulation robot 50 (described later). The imaginary robot model may have a configuration including a robot body similar to the simulation robot 50 (described later), or may have a configuration including not only the robot body but processing object(s), peripheral device(s), etc.

The simulation robot 50 is a device for executing the simulation which causing the actual robots 50A1-50An (n is a natural number (n=1, . . . )) to carry out the simulated operation as a robot model. In the training system 1, it is possible to give the training for the robot manipulation by utilizing the simulation using the robots 50A1-50An. The robots 50A1-50An may be any kind of robots, and, for example, they may be industrial robots, service robots, construction machinery, tunnel boring machines, cranes, cargo handling vehicles, humanoids, etc. The service robot is a robot which is used in various service industries, such as nursing, medical science, cleaning, guard, guide, rescue, cooking, and goods offering. In this embodiment, the robots 50A1-50An are industrial robots, such as vertical articulated robots, horizontal articulated robots, polar-coordinate robots, cylindrical-coordinate robots, and rectangular-coordinate robots. In the following, when not distinguishing the robots 50A1-50An from each other, they may simply be referred to as the "robot 50A."

The simulation robot 50 includes any of the robots 50A1-50An, and is provided to each of the robots 50A1-50An. The robots 50A1-50An, which are industrial robots, are robots provided corresponding to various works. The robots 50A1-50An may be robots actually disposed at a worksite, or may be a robot disposed for simulation. The robots 50A1-50An may have, for example, a configuration including a robot body provided with robotic arm(s) and end effector(s), or a configuration not only including the robot body but also including a processing object, such as a workpiece for the work, and peripheral devices, such as a conveying device, an imaging device, and a sensor. In the latter case, the simulation executed by the simulation robot 50 is a simulation for manipulating all of the robot body, the processing object, and the peripheral devices. Note that the simulation robot 50 may or may not be produced especially for the training system 1, and, for example, it may be an existing or general-purpose robot used for the simulation for the robot manipulation.

The manipulation terminal 20 is a device for executing a computer program of the training for the robot manipulation. The manipulation terminal 20 can be operated by the user. The manipulation terminal 20 can selectively perform, by executing the computer program, a first training which is a training for the robot manipulation without using the simulation device 200, and a second training which is a training for the robot manipulation using the simulation device 200. Such a manipulation terminal 20 is connectable with the simulation device 200 through the communication network 90. In the first training, the imaginary robot model generated by the computer program which the manipulation terminal 20 executes operates according to a manipulation inputted into the manipulation terminal 20. For example, the user operates the manipulation terminal 20 to operate the imaginary robot model according to the content of the training.

In the second training, the manipulation terminal 20 is connected with the simulation device 200 such as the simulation computer 40 and the simulation robot 50 through the communication network 90. The manipulation terminal 20 outputs the information inputted by the user to the simulation device 200. The robot model of the simulation device 200 operates according to the manipulation inputted into the manipulation terminal 20. For example, even if the user is located distant from the simulation device 200, he/she can operate the manipulation terminal 20 to operate the robot model of the simulation device 200 according to the content of the training.

Examples of the manipulation terminal 20 are a game machine, a game controller, a remote controller dedicated for the robot, a smart device such as a personal data assistant (PDA), a smartphone, a smartwatch, and a tablet, and a computer device such as a personal computer. Such a manipulation terminal 20 may or may not be a device produced especially for the training system 1, or may be an existing or general-purpose device.

In this embodiment, the manipulation terminal 20 is a game device provided with a game machine and a game controller. The game device includes, for example, a non-portable game device and a portable game device. The manipulation terminal 20 is connected to an output device 31 and outputs an image signal and an audio signal for performing the training for the robot manipulation to the output device 31. The output device 31 presents the user the image and the voice corresponding to the image signal and the audio signal. For example, the output device 31 is provided with a display and a speaker. Examples of the display are a liquid crystal display, and an organic or inorganic EL display (Electro-Luminescence Display).

The intermediation device 10 mediates between one or more manipulation terminals 20, one or more simulation computers 40, one or more simulation robots 50, and one or more coaching terminals 60 through the communication network 90. In this embodiment, the intermediation device 10 is provided with an information processing device 100 which is one example of a training processing device. In this embodiment, the intermediation device 10 is a server and is a computer device having a communication capability and processing information.

The coaching terminal 60 is a device for coaching the training by assisting the robot manipulation inputted into the manipulation terminal 20 during the execution of the training for the robot manipulation. The coaching terminal 60 can be operated by a user, such as a coach, and, for example, it accepts an input of the robot manipulation. The coaching terminal 60 may be configured to coach the training in either the first training or the second training, and in this embodiment, it is configured to coach in both the trainings The coaching terminal 60 is connected with the manipulation terminal 20 and the simulation device 200 through the communication network 90. The coaching terminal 60 outputs the information inputted by being operated to the intermediation device 10 and/or the manipulation terminal 20. The coaching terminal 60 acquires information on the operation of the robot model from the manipulation terminal 20 and the simulation device 200.

The coaching terminal 60 is connected to an output device 32 and outputs the image signal and the audio signal for coaching the training indicative of the operation of the robot model to the output device 32, and the output device 32 presents the user of the coaching terminal 60 the image and the voice corresponding to the image signal and the audio signal. For example, the output device 32 is provided with a display and a speaker.

Examples of the coaching terminal 60 are a game machine, a game controller, a remote controller dedicated for the robot, a smart device such as a personal data assistant (PDA), a smartphone, a smartwatch, and a tablet, and a computer device such as a personal computer. In this embodiment, the coaching terminal 60 is a remote controller dedicated for the robot. Such a coaching terminal 60 may or may not be a device produced especially for the training system 1, or may be an existing or general-purpose device.

The coaching terminal 60 receives first information which is information on the robot manipulation inputted into the manipulation terminal 20, and/or information on the operation of the robot model according to the first information, from the manipulation terminal 20 through the intermediation device 10. The first information may be information on the robot manipulation inputted into the manipulation terminal 20, or may be information from which the information is converted by the intermediation device 10. Alternatively, the coaching terminal 60 receives the information on the operation of the robot model according to the first information from the simulation device 200. The coaching terminal 60 causes the output device 32 to present the operation to the coach who is a user of the coaching terminal 60 by outputting the operation of the robot model according to the first information to the output device 32. Moreover, the coaching terminal 60 accepts, for the presented operation, an assisting command which assists the robot manipulation inputted into the coaching terminal 60. That is, the coach can input the assisting command for the robot manipulation into the coaching terminal 60, while confirming the robot manipulation presented to the output device 32. The coaching terminal 60 transmits the assisting command to the manipulation terminal 20 through the intermediation device 10, and causes the manipulation terminal 20 to present the assisting command to the user through the output device 31. The assisting command may be a command using at least one of an image and voice for guiding or correcting the robot manipulation, or may be any kind of command which assists the robot manipulation.

The information processing device 100 is a device for managing the training for the robot manipulation using the manipulation terminal 20. The information processing device 100 is comprised of, for example, a computing unit having a processor, a memory, etc. The memory is comprised of a storage, such as a semiconductor memory (e.g., a volatile memory and a nonvolatile memory), a hard disk drive (HDD), and an SSD (Solid State Drive). For example, the functions of the computing unit may be implemented by a computer system (not illustrated) comprised of a processor such as a CPU (Central Processing Unit), a volatile memory such as a RAM (Random Access Memory), and a nonvolatile memory such as a ROM (Read-Only Memory). Some or all of the function of the computing unit may be implemented by the CPU executing a program recorded on the ROM using the RAM as a work area. Note that some or all of the functions of the computing unit may be implemented by the computer system described above, may be implemented by dedicated hardware circuitry such as an electronic circuit or an integrated circuit, or may be implemented by a combination of the computer system and the hardware circuitry.

In detail, the information processing device 100 may be comprised of, for example, a computer device, such as a computer and a personal computer. Alternatively, the information processing device 100 may be comprised of, for example, a microcontroller, an MPU (Micro Processing Unit), an LSI (Large Scale Integration), a system LSI, a PLC (Programmable Logic Controller), and a logic circuit. The plurality of functions of the information processing device 100 may be implemented by individual chips, or may be implemented by a sole chip including a part or all the functions. Alternatively, the circuit may be a general-purpose circuit, or may be a circuit for exclusive use. As the LSI, an FPGA (Field Programmable Gate Array) which can be programmed after the manufacture of the LSI, a reconfigurable processor which can reconfigure a connection and/or a setting of a circuit cell inside the LSI, or an ASIC (Application Specific Integrated Circuit) in which circuits for a plurality of functions are integrated into one circuitry for particular applications, may be used.

The information processing device 100 communicates information between the manipulation terminal 20 through the communication network 90, accepts the first information which is information on the user's robot manipulation inputted by the manipulation terminal 20 during the execution of the computer program for the training of the robot manipulation on the manipulation terminal 20, and manages the training based on the first information. Moreover, the information processing device 100 evaluates a result of the training based on the first information, during the execution of the training. For example, in the first training, the information processing device 100 is connected to the manipulation terminal 20, and carries out the evaluation described above based on a comparison result of the first information with the robot manipulation contained in the content of the training. For example, the information processing device 100 may determine the evaluation based on differences in their positions and durations (required time).

In the second training, the information processing device 100 connects the manipulation terminal 20 to the simulation device 200, and carries out the evaluation based on a comparison result of the operation of the robot model of the simulation device 200 which operates based on the first information, with the operation contained in the content of the training. For example, the information processing device 100 may compare each operation of the robot model with the operation to be performed by the training, and determine the evaluation based on differences in their positions and durations. Alternatively, the simulation device 200 may evaluate an operation result of the robot model. The information processing device 100 may receive the evaluation from the simulation device 200, and may determine the evaluation of the training based on the received evaluation.

Moreover, the information processing device 100 registers, in any of the trainings, the evaluation of the result of the training also as a user evaluation which is an evaluation of the user who operates the manipulation terminal 20. For example, the information processing device 100 registers the user evaluation in the storage. The storage may be a storage of the information processing device 100, or may be a storage (not illustrated) provided to the intermediation device 10, or may be storages of other devices connected with the intermediation device 10 through the communication network 90. Moreover, the information processing device 100 transmits the evaluation of the result of the training to the manipulation terminal 20 to present the evaluation to the user through the output device 31.

Moreover, for example, when the computer program for the training is executed on the manipulation terminal 20, the information processing device 100 determines a user-executable training 100 based on the registered user evaluation. Moreover, the information processing device 100 transmits the determined training to the manipulation terminal 20 to present it to the user through the output device 31. For example, the determined and presented training may be a configuration of the training, and the configuration of the training includes the content of the training, and a device which operates the robot model for performing the content of the training. The device described above is the manipulation terminal 20, the simulation computer 40, or the simulation robot 50.

Moreover, the information processing device 100 accepts a request for selecting a training among the first training and the second training through the manipulation terminal 20. The information processing device 100 executes the selected training. In the first training, the manipulation terminal 20 executes the training, and the information processing device 100 evaluates the training result.

In the second training, the information processing device 100 converts the first information on the robot manipulation which is received from the manipulation terminal 20 into the second information which is information for manipulating the robot model of the simulation device 200. The information processing device 100 transmits the second information to the simulation device 200, and operates it according to the second information.

Moreover, the information processing device 100 receives, from the simulation device 200 which operates according to the second information, third information which is information on the operation of this robot model, and converts the third information into fourth information which is information processable by the manipulation terminal 20. For example, the information processing device 100 receives the third information indicative of each operation of the robot model of the simulation device 200, and converts the third information into the fourth information as information which functions on the execution program of the manipulation terminal 20. The information processing device 100 transmits to the manipulation terminal 20, the fourth information to the manipulation terminal 20 to present the user the operation of the robot model of the simulation device 200, or a pseudo robot model of the robot model, or a corresponding model, through the output device 31. The corresponding model may be a model associated with the robot model, and, for example, it may not be apparently similar to the robot model.

For example, the information processing device 100 may receive information on an image of the robot 50A of the simulation robot 50 captured by the imaging device as the third information and transmit the information on the image to the manipulation terminal 20 as the fourth information to cause the manipulation terminal 20 to present it as the information on the operation of the robot model. Thus, the user can perform the training of the robot manipulation through the manipulation terminal 20, while visually recognizing the robot model of the simulation computer 40 or the simulation robot 50.

Moreover, the information processing device 100 determines the simulation device 200 corresponding to the content of the training among the plurality of simulation devices 200 based on the content of the training which is inputted into the manipulation terminal 20 by the user and is requested to be executed. Moreover, the information processing device 100 connects the determined simulation device 200 with the manipulation terminal 20 through the communication network 90 to enable the execution of training using the simulation device 200.

[Hardware Configuration]

Figure 2:
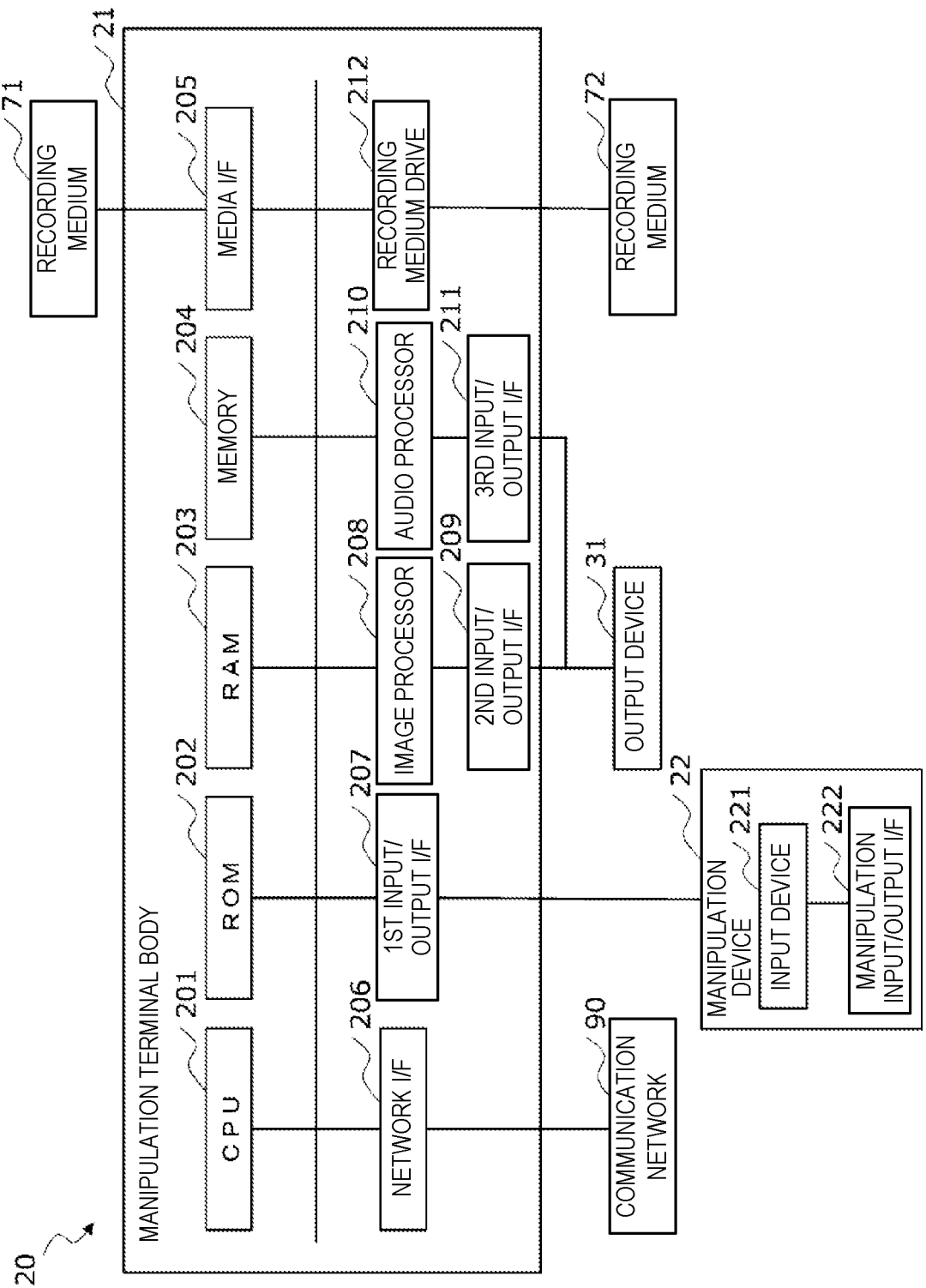
FIG. 2 is a block diagram illustrating one example of a hardware configuration of a manipulation terminal according to the embodiment.

A hardware configuration of the manipulation terminal 20 is described. FIG. 2 is a block diagram illustrating one example of a hardware configuration of the manipulation terminal 20 according to this embodiment. As illustrated in FIG. 2, the manipulation terminal 20 includes a manipulation terminal body 21 as the game machine, and a manipulation device 22 as the game controller. The manipulation terminal body 21 can execute the computer program for the training, and the manipulation device 22 accepts an input of the manipulation by the user. The manipulation terminal body 21 includes, as components, a CPU 201, a ROM 202, a RAM 203, a memory 204, a media interface (I/F) 205, a network I/F 206, a first input/output I/F 207, an image processor 208, a second input/output I/F 209, an audio processor 210, a third input/output I/F 211, and a recording medium drive 212. Although each component is connected by a bus etc., it may be connected through any other kinds of wired communications or wireless communications. Note that not all the components are essential.

The CPU 201 controls the entire operation of the manipulation terminal body 21. The ROM 202 stores a program used for driving the CPU 201. The RAM 203 is used as a work area of the CPU 201. The memory 204 stores various data, such as a program, and is comprised of the storage described above. The media I/F 205 controls read or write (store) of data from/to a recording medium 71, such as a flash memory. For example, the computer program for executing the training may be stored in the recording medium 71, and may be executed by being read from the recording medium 71. Save data including the result of the training may be stored in the recording medium 71 or the memory 204. The network I/F 206 is an interface for carrying out data communications using the communication network 90. The first input/output I/F 207 is connected with the manipulation device 22, and is an interface for communicating a signal etc.

The image processor 208 is provided with a GPU (Graphics Processing Unit) which can generate a screen for performing the training. For example, the image processor 208 generates screen data, such as an image of the robot model generated by the manipulation terminal body 21, or the robot model of the simulation computer 40 or the simulation robot 50, an image of the pseudo robot model of the robot model, and an image of the model corresponding to the robot model, and outputs the image to the second input/output I/F 209. The second input/output I/F 209 is connected with the output device 31, and is an interface for communicating screen data and image data.

The audio processor 210 is provided with a DSP (Digital Signal Processor) which generates voice for the training. The audio processor 210 amplifies the generated voice by an amplifier (not illustrated) including a D/A converter, and outputs it to the third input/output I/F 211. The third input/output I/F 211 is connected with the output device 31, and is an interface for communicating the audio signal etc. The recording medium drive 212 controls read or write of various data from/to a recording medium 72 which is removable. For example, the computer program for executing the training may be stored in the recording medium 72, or may be executed by being read from the recording medium 72. Save data including the result of the training etc. may be stored in the recording medium 72. An example of the recording medium 72 is a recording disc, such as DVD-R, DVD-RW, BD(Blu-Ray®)-R, and BD-RE.

The manipulation device 22 accepts an input by the user. For example, the manipulation device 22 includes an input device 221 which is inputted through a manipulation by the user, such as a cross button, a push switch, a dial, a joystick, a mouse, a key, and a touch panel. Moreover, the manipulation device 22 includes a manipulation input/output I/F 222 which is connected with the first input/output I/F 207 of the manipulation terminal body 21, and communicates a signal etc. The input device 221 generates a signal indicative of the input by the user, and outputs the signal to the first input/output I/F 207 through the manipulation input/output I/F 222. In this embodiment, the configuration of the input device 221 differs from the manipulation device dedicated for the robot. For example, the number of input devices 221 and the input method to the input device 221 are different. Unlike the signal for the manipulation outputted from the input device 221, the signal for the manipulation outputted from the manipulation device dedicated for the robot is more complicated.

Figure 3:
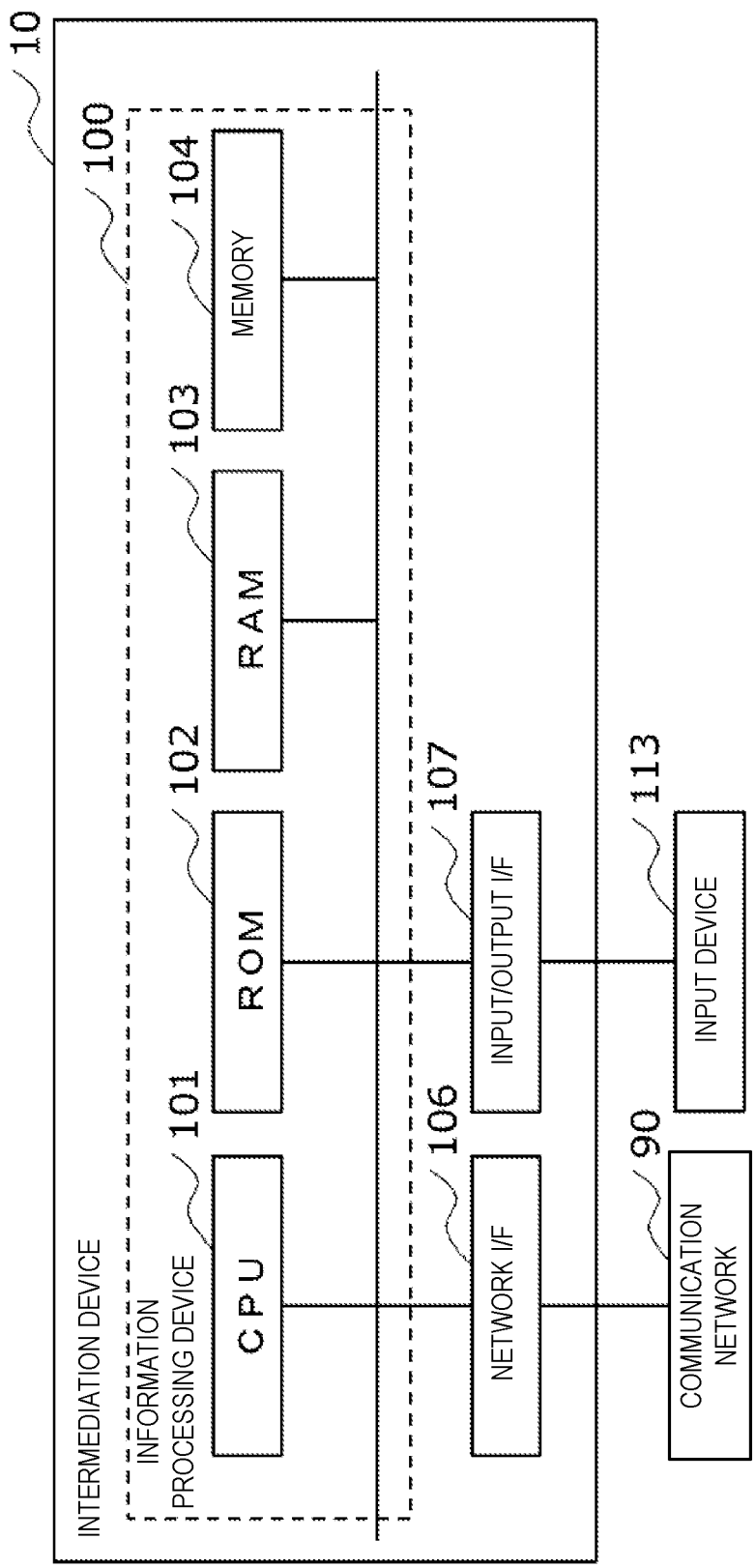
FIG. 3 is a block diagram illustrating one example of a hardware configuration of an intermediation device according to the embodiment.

A hardware configuration of the intermediation device 10 is described. FIG. 3 is a block diagram illustrating one example of the hardware configuration of the intermediation device 10 according to this embodiment. As illustrated in FIG. 3, the intermediation device 10 includes a CPU 101, a ROM 102, a RAM 103, a memory 104, a network I/F 106, and an input/output I/F 107, as components. Although each component is connected by a bus etc., it may be connected through any other kinds of wired communications or wireless communications. Note that not all the components are essential.

The CPU 101 controls the entire operation of the intermediation device 10. The configurations and functions of the ROM 102, the RAM 103, and the memory 104 are similar to those of the ROM 202, the RAM 203, and the memory 204 of the manipulation terminal 20, respectively. The CPU 101, the ROM 102, the RAM 103, and the memory 104 constitute the information processing device 100. The configurations and functions of the network I/F 106 and the input/output I/F 107 are similar to those of the network I/F 206 and the first input/output I/F 207 of the manipulation terminal 20, respectively.

Note that the input/output I/F 107 is connected with an input device 113, and is an interface for communicating a signal etc. The input device 113 accepts an input by the user. For example, the input device 113 includes a device inputted through a manipulation of the user, such as a button, a switch, a dial, a joystick, a mouse, a key, and a touch panel. The input device 113 generates a signal indicative of the user's input, and outputs the signal to the input/output I/F 107.

Figure 4:
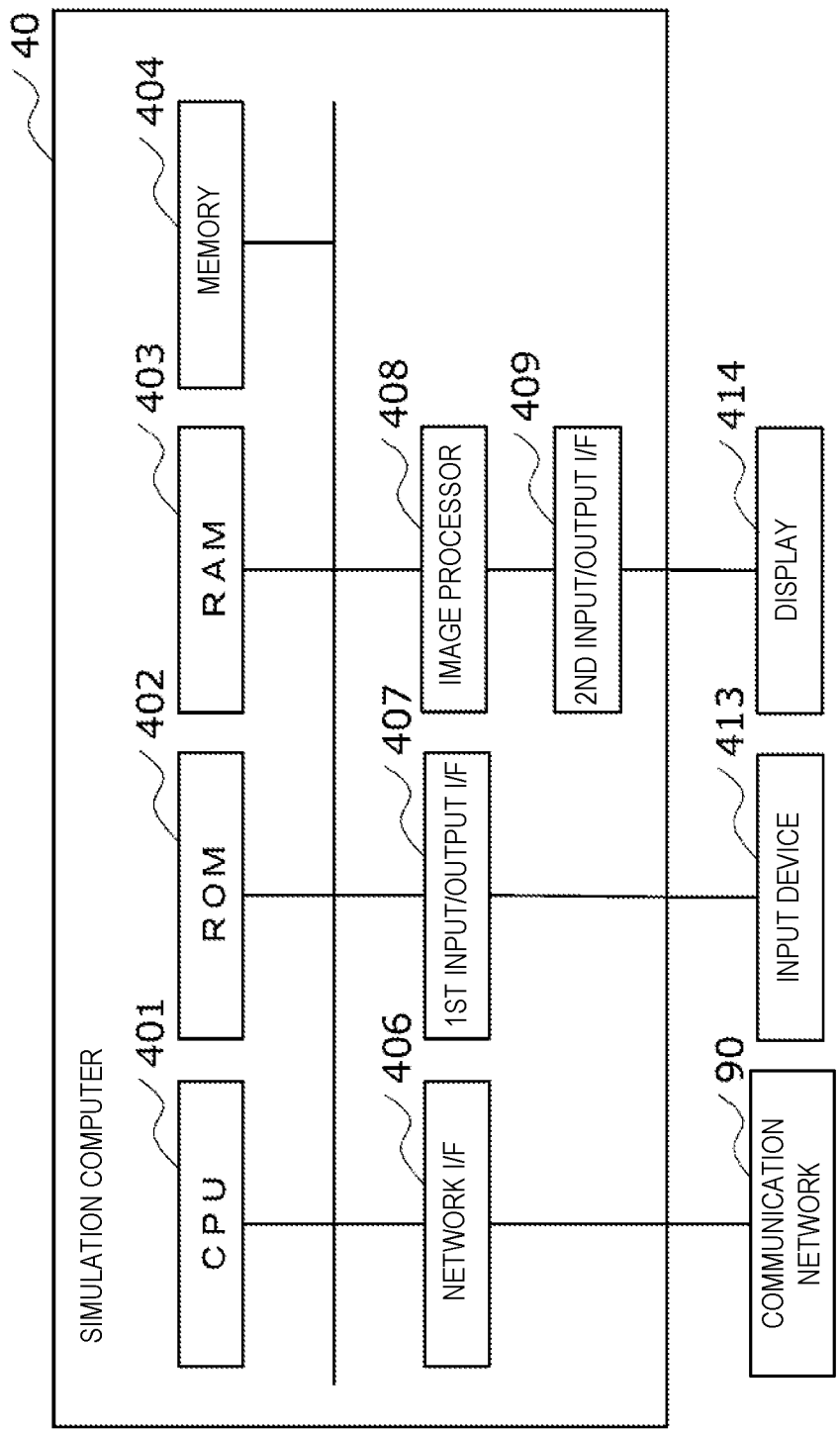
FIG. 4 is a block diagram illustrating one example of a hardware configuration of a simulation computer according to the embodiment.

A hardware configuration of the simulation computer 40 is described. FIG. 4 is a block diagram illustrating one example of the hardware configuration of the simulation computer 40 according to this embodiment. As illustrated in FIG. 4, the simulation computer 40 includes a CPU 401, a ROM 402, a RAM 403, a memory 404, a network I/F 406, a first input/output I/F 407, an image processor 408, and a second input/output I/F 409, as components. Although each component is connected by a bus etc., it may be connected through any other kinds of wired communications or wireless communications. Note that not all the components are essential.

The CPU 401 controls the entire operation of the simulation computer 40. The configurations and functions of the ROM 402, the RAM 403, and the memory 404 are similar to those of the ROM 202, the RAM 203, and the memory 204 of the manipulation terminal 20, respectively. The configurations and functions of the network I/F 406, the first input/output I/F 407, the image processor 408, and the second input/output I/F 409 are similar to those of the network I/F 206, the first input/output I/F 207, the image processor 208, and the second input/output I/F 209 of the manipulation terminal 20, respectively.

Note that the first input/output I/F 407 is connected with an input device 413, and is an interface for communicating a signal etc. The input device 413 accepts an input by the user. The configuration of the input device 413 is similar to that of the input device 113 of the intermediation device 10. Moreover, the image processor 408 generates screen data of an image of the robot model set to the simulation computer 40, and outputs it to the second input/output I/F 409. The second input/output I/F 409 is connected with a display 414 and is an interface for communicating screen data and image data.

Figure 5:
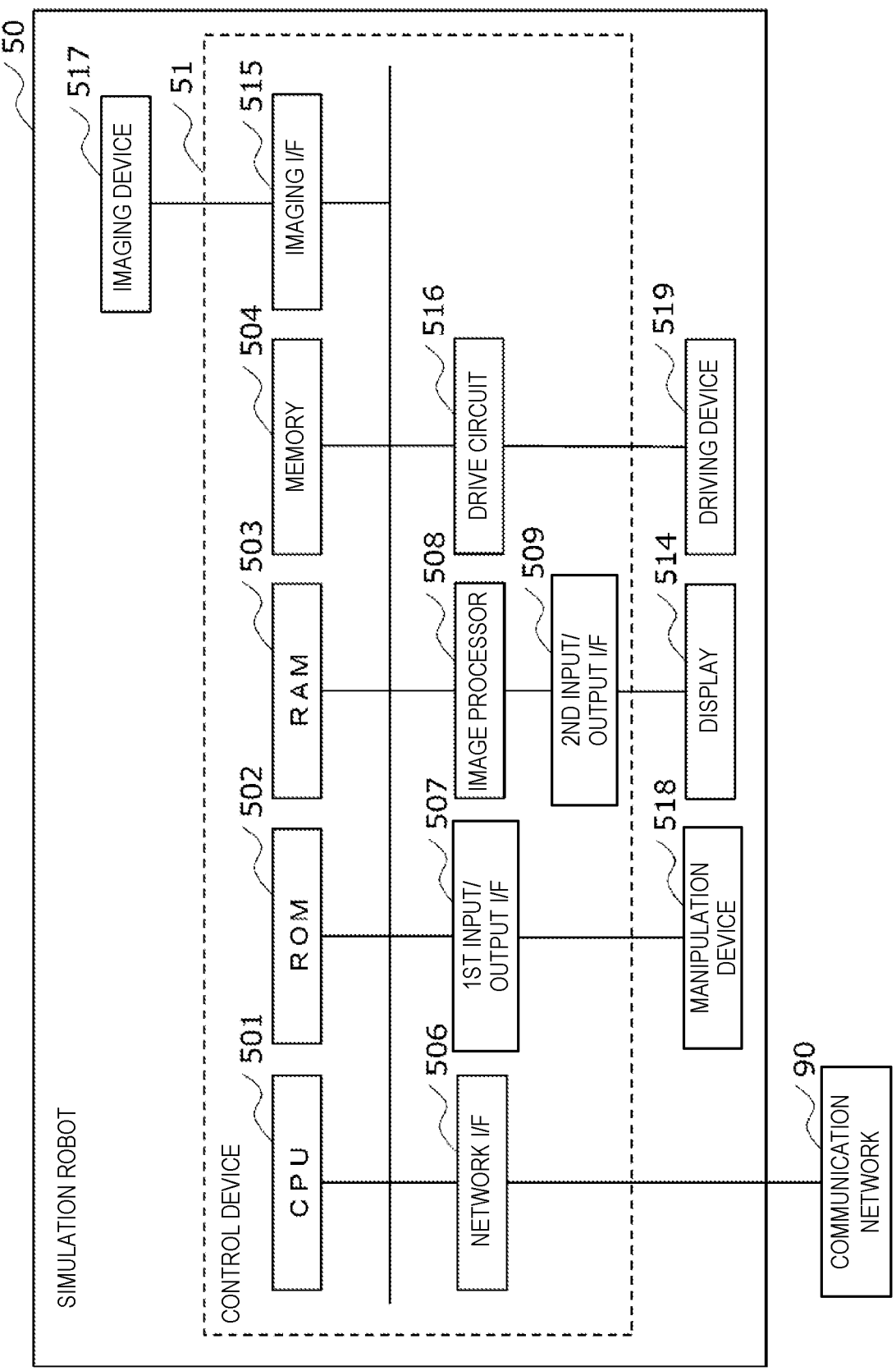
FIG. 5 is a block diagram illustrating one example of a hardware configuration of a simulation robot according to the embodiment.

A hardware configuration of the simulation robot 50 is described. FIG. 5 is a block diagram illustrating one example of the hardware configuration of the simulation robot 50 according to this embodiment. As illustrated in FIG. 5, the simulation robot 50 includes a control device 51, an imaging device 517, a display 514, a manipulation device 518, and a driving device 519. Note that not all the components are essential.

The driving device 519 is a device for driving movable part(s) of the robot 50A (see FIG. 1). For example, the robot 50A includes a robotic arm, and an end effector at a tip end of the robotic arm. The robotic arm has a bendable joint and is movable at the joint. The end effector carries out operation for applying an action to a workpiece, such as grasping (holding), sucking, scooping, and hanging. The driving device 519 drives the joint and the end effector of the robotic arm. Examples of the driving device 519 are an electric motor such as a servomotor, and a vacuum generator.

The imaging device 517 images the robot 50A and outputs the captured image data to the control device 51. The imaging device 517 provides an image indicative of a state of the robot 50A to the user who uses the simulation robot 50 with the simulation robot 50. In this embodiment, the image is provided to the manipulation terminal 20 and the coaching terminal 60. Examples of the imaging device 517 are a digital camera, a digital camcorder, etc.

The display 514 receives the image data captured by the imaging device 517 from the control device 51, and presents the user the image of the image data. Moreover, the display 514 receives the screen data for the manipulation of the simulation robot 50 from the control device 51, and presents the user the image of the screen data.

The manipulation device 518 accepts an input of a command and information by the user who uses the simulation robot 50, and outputs a signal indicative of the command and information to the control device 51. The manipulation device 518 includes a device inputted through a manipulation of the user, such as a push switch, a lever, a dial, a joystick, a key, and a touch panel. In this embodiment, the manipulation device 518 is a manipulation device dedicated for the robot 50A.

The control device 51 is a device for controlling the entire simulation robot 50. The control device 51 includes a CPU 501, a ROM 502 and a RAM 503, a memory 504, an imaging I/F 515, a network I/F 506, a first input/output I/F 507, an image processor 508, a second input/output I/F 509, and a drive circuit 516, as components. Although each component is connected by a bus etc., it may be connected through any other kinds of wired communications or wireless communications. Note that not all the components are essential.

The CPU 501 controls operation of the entire control device 51. The configurations and functions of the ROM 502, the RAM 503, and the memory 504 are similar to those of the ROM 202, the RAM 203, and the memory 204 of the manipulation terminal 20, respectively. The configurations and functions of the network I/F 506, the first input/output I/F 507, the image processor 508, and the second input/output I/F 509 are similar to those of the network I/F 206, the first input/output I/F 207, the image processor 208, and the second input/output I/F 209 of the manipulation terminal 20, respectively.

Note that the first input/output I/F 507 is connected with the manipulation device 518, and is an interface for communicating a signal etc. Moreover, the image processor 508 generates screen data for being displayed on the display 514 by using the image data of the robot 50A captured by the imaging device 517, and outputs it to the second input/output I/F 509. Moreover, the image processor 508 generates the screen data for manipulating the simulation robot 50, and outputs it to the second input/output I/F 509. The second input/output I/F 509 is connected with the display 514 and is an interface for communicating screen data and image data.

The imaging I/F 515 controls the drive of the imaging device 517 corresponding to execution of a program. The imaging I/F 515 takes the image data captured by the imaging device 517 into the RAM 503 or the memory 504, corresponding to execution of the program. The imaging I/F 515 may also include a circuit for driving the imaging device 517.

The drive circuit 516 controls the drive of the driving device 519. For example, the drive circuit 516 supplies current to each driving device 519 according to the command from the CPU 501 to control the drive of the driving device 519. The drive circuit 516 controls the drive of all the driving devices 519.

Figure 6:
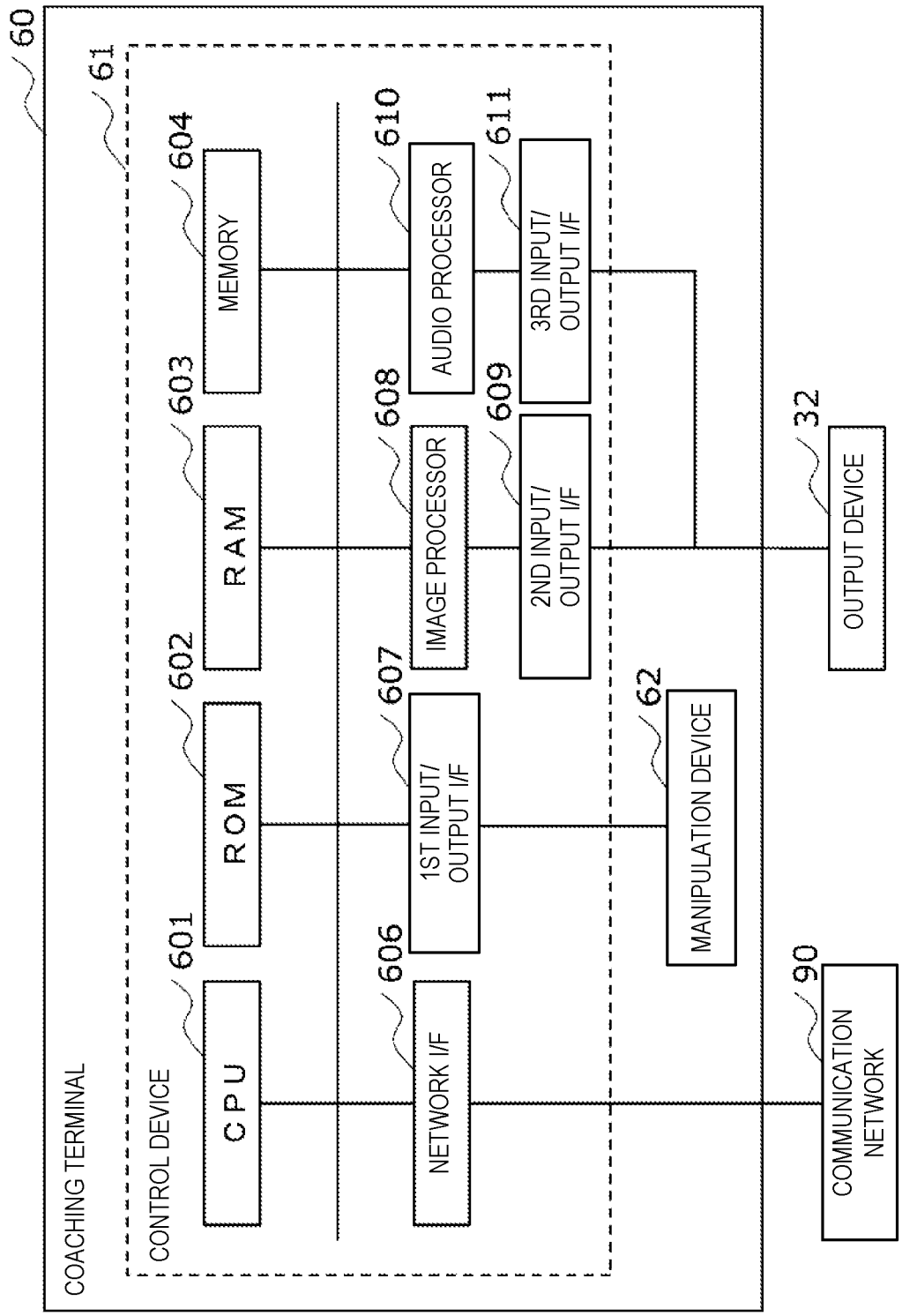
FIG. 6 is a block diagram illustrating one example of a hardware configuration of a coaching terminal according to the embodiment.

A hardware configuration of the coaching terminal 60 is described. FIG. 6 is a block diagram illustrating one example of the hardware configuration of the coaching terminal 60 according to this embodiment. As illustrated in FIG. 6, the coaching terminal 60 is provided with a control device 61 and a manipulation device 62. The manipulation device 62 accepts an input of a command and information by the user who uses the coaching terminal 60, and outputs a signal indicative of the command and information to the control device 61. The manipulation device 62 includes a device inputted through a manipulation of the user, such as a push switch, a lever, a dial, a joystick, a key, and a touch panel. In this embodiment, the manipulation device 62 is a manipulation device dedicated for the robot, similar to the manipulation device 518 of the simulation robot 50.

The control device 61 includes a CPU 601, a ROM 602, a RAM 603, a memory 604, a network I/F 606, a first input/output I/F 607, an image processor 608, a second input/output I/F 609, an audio processor 610, and a third input/output I/F 611, as components. Although each component is connected by a bus etc., it may be connected through any other kinds of wired communications or wireless communications. Note that not all the components are essential.

The CPU 601 controls operation of the entire control device 61. The configurations and functions of the ROM 602, the RAM 603, and the memory 604 are similar to those of the ROM 202, the RAM 203, and the memory 204 of the manipulation terminal 20, respectively. The configurations and functions of the network I/F 606, the first input/output I/F 607, the image processor 608, the second input/output I/F 609, the audio processor 610, and the third input/output I/F 611 are similar to those of the network I/F 206, the first input/output I/F 207, the image processor 208, the second input/output I/F 209, the audio processor 210, and the third input/output I/F 211 of the manipulation terminal 20, respectively.

Note that the first input/output I/F 607 is connected with the manipulation device 62, and is an interface for communicating a signal etc. Moreover, the image processor 608 generates screen data for being displayed on the output device 32 by using the data received from the manipulation terminal 20 and the simulation device 200, and outputs it to the second input/output I/F 609. Moreover, the image processor 608 generates screen data for operating the coaching terminal 60, and outputs it to the second input/output I/F 609. The second input/output I/F 609 is connected with the output device 32, and is an interface for communicating screen data and image data. The audio processor 610 generates voice data to be outputted to the output device 32 by using the data received from the manipulation terminal 20 and the simulation device 200, and outputs it to the third input/output I/F 611. The third input/output I/F 611 is connected with the output device 32 and is an interface for communicating the voice data generated by the audio processor 610.

[Functional Configuration]

Figure 7:
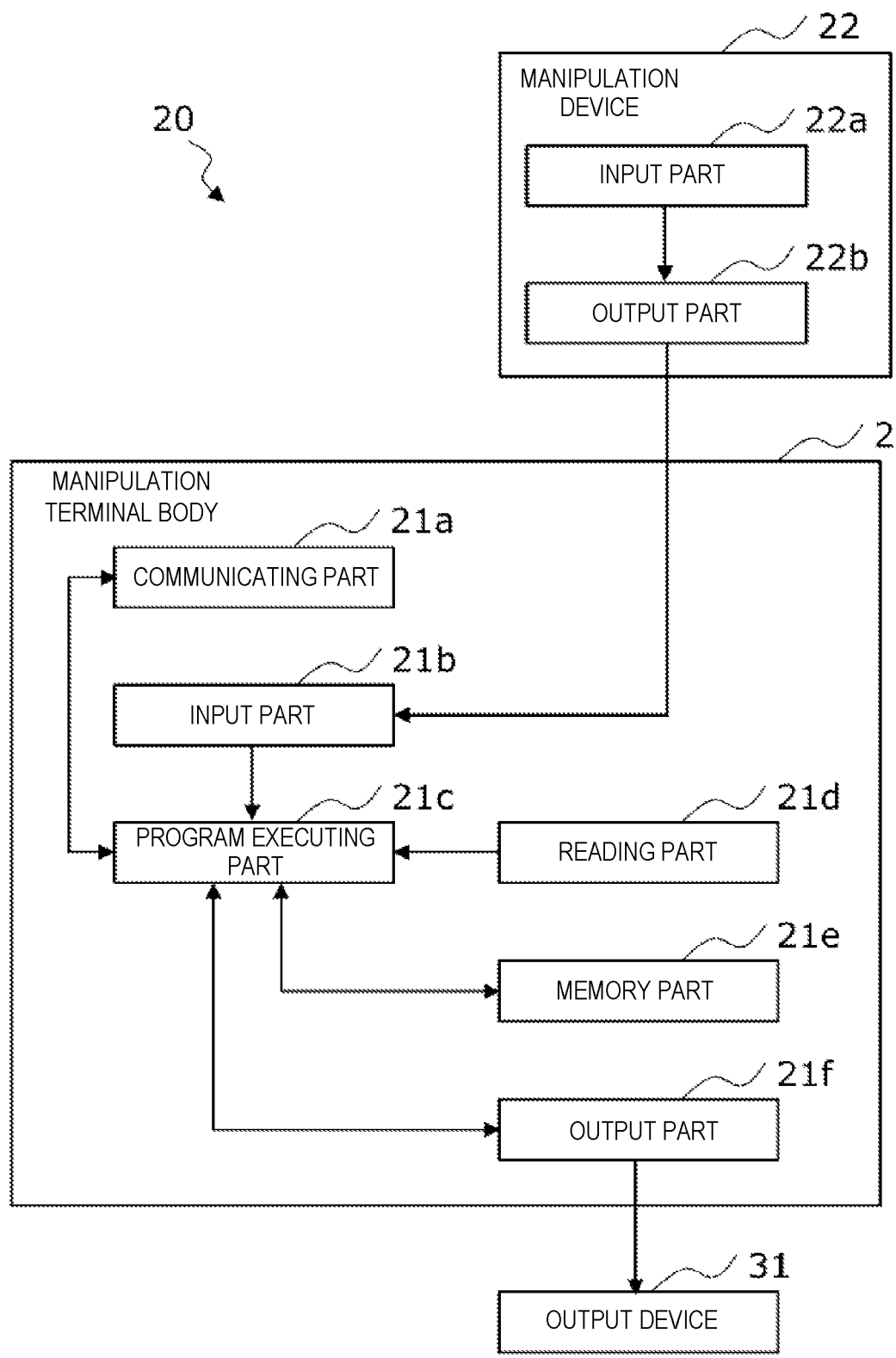
FIG. 7 is a block diagram illustrating one example of a functional configuration of a manipulation terminal according to the embodiment.

A functional configuration of the manipulation terminal 20 is described. FIG. 7 is a block diagram illustrating one example of the functional configuration of the manipulation terminal 20 according to this embodiment. As illustrated in FIG. 7, the manipulation device 22 includes an input part 22*a* and an output part 22*b*. The input part 22*a* accepts an input from the user, and the function is implemented by the input device 221. The output part 22*b* outputs the information inputted into the input part 22*a* to the manipulation terminal body 21, and the function is implemented by the manipulation input/output I/F 222. The information described above may be information, such as ON of a button of the input device 221, and duration of OFF/ON.

The manipulation terminal body 21 includes a communicating part 21*a*, an input part 21*b*, a program executing part 21*c*, a reading part 21*d*, a memory part 21*e*, and an output part 21*f*. Note that not all the components are essential. The communicating part 21*a* communicates with the intermediation device 10 through the communication network 90, and the function is implemented by the network I/F 206 etc. The input part 21*b* accepts an input of information from the manipulation device 22, and the function is implemented by the first input/output I/F 207 etc. The reading part 21*d* reads information stored in the recording medium 71 and/or the recording medium 72, and the function is implemented by the media I/F 205 and the recording medium drive 212.

The memory part 21*e* stores various information, and it is implemented by the ROM 202, the memory 204, the recording medium 71, and the recording medium 72. For example, user information of each user is stored in the memory part 21*e*. The user information may include user's identification information such as a user ID, and the result of the training of the user who used the manipulation terminal 20. The result of the training may also include a result, an evaluation, and an experience of each training, a user's learning level in each training, and a user's rank or class according to the learning level. The rank and the class may be an absolute rank corresponding to the learning level, or may be a relative rank such as a ranking based on a comparison with other users. The storing of the user information in the memory part 21*e* may be automatically and periodically performed by the program executing part 21*c*, or may be carried out by the user performing an input or save operation using the manipulation device 22.

The output part 21*f* outputs the image data and the voice data which are generated by the program executing part 21*c* to the output device 31, and the function is implemented by the second input/output I/F 209 and the third input/output I/F 211.

The program executing part 21*c* reads and executes the computer program stored in the recording medium 71 or the recording medium 72. The computer program is a program for executing the training, and, in this embodiment, it is a game program. That is, in this embodiment, the training is performed as a game in the manipulation terminal 20. Note that the program may be installed in the manipulation terminal 20 through the communication network 90, the recording medium 71, or the recording medium 72, as an application program, and may be stored in the ROM 202 or the memory 204.

The program executing part 21*c* operates according to the computer program using the information received from the manipulation device 22 and the information received through the communication network 90, and generates the image data and the voice data reflecting the received information. The program executing part 21*c* outputs the generated image data and voice data to the output device 31 through the output part 21*f* to present them to the user. Moreover, the program executing part 21*c* transmits the information on the manipulation received from the manipulation device 22 and the user information stored in the memory part 21*e* to the intermediation device 10 through the communicating part 21*a* and the communication network 90. The program executing part 21*c* is implemented by the CPU 201, the ROM 202, the RAM 203, the image processor 208, and the audio processor 210.

Figure 8:
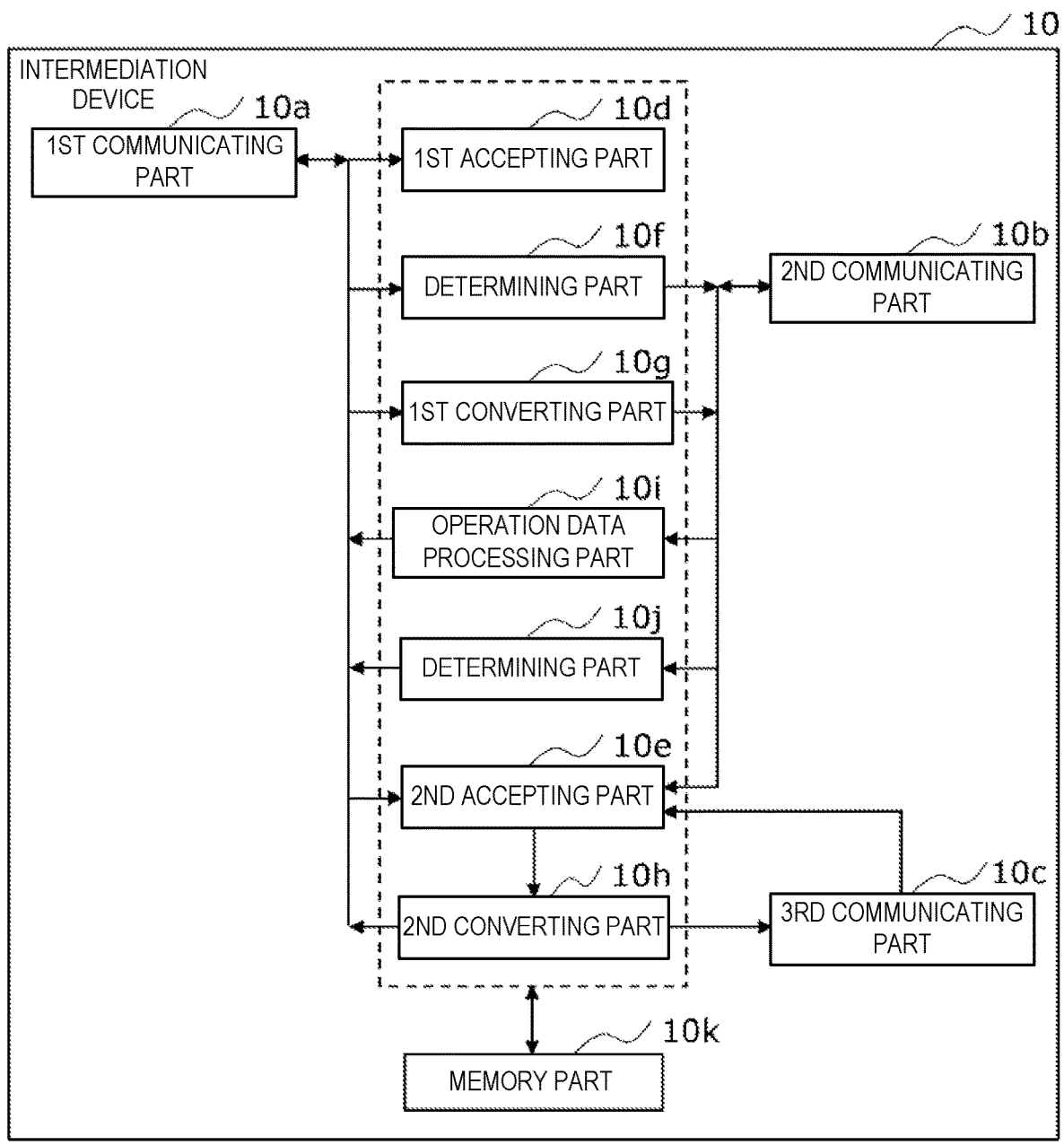
FIG. 8 is a block diagram illustrating one example of a functional configuration of the intermediation device according to the embodiment.

A functional configuration of the intermediation device 10 is described. FIG. 8 is a block diagram illustrating one example of the functional configuration of the intermediation device 10 according to this embodiment. As illustrated in FIG. 8, the intermediation device 10 includes a first communicating part 10*a*, a second communicating part 10*b*, a third communicating part 10*c*, a first accepting part 10*d*, a second accepting part 10*e*, a determining part 10*f*, a first converting part 10*g*, a second converting part 10*h*, an operation data processing part 10*i*, a determining part 10*j*, and a memory part 10*k*. Note that not all the components are essential.

The functions of the first communicating part 10*a*, the second communicating part 10*b*, and the third communicating part 10*c* are implemented by the network I/F 106 etc. The function of the memory part 10*k* is implemented by the ROM 102 and the memory 104. The functions of the first accepting part 10*d*, the second accepting part 10*e*, the determining part 10*f*, the first converting part 10*g*, the second converting part 10*h*, the operation data processing part 10*i*, and the determining part 10*j* are implemented by the CPU 101, the ROM 102, and the RAM 103.

The first communicating part 10*a* communicates with the manipulation terminal 20 through the communication network 90. The second communicating part 10*b* communicates with the simulation computer 40 or the simulation robot 50 through the communication network 90. The third communicating part 10*c* communicates with the coaching terminal 60 through the communication network 90.

The memory part 10*k* stores various information. For example, the user information of each user is stored in the memory part 10*k* so as to be associated with the user's identification information. Moreover, a clearance requirement of the training based on the rank or the class set to the user, and the configuration of the training which can be performed with each clearance requirement are stored in the memory part 10*k* so as to be associated with each other. The configuration of the training includes the content of the training, and a device having the robot model which can perform the content of the training, which are associated with each other. The device having the robot model is the manipulation terminal 20, the simulation computer 40, or the simulation robot 50. Moreover, the memory part 10k may also include an executed result of each content of training using each robot model, and an evaluation related to the executed result, which are associated with each other. Moreover, the memory part 10k may also include the evaluation described above, and the learning level of the content of the training corresponding to the evaluation, which are associated with each other. Moreover, the memory part 10k may also include the learning level of the content of the training, and the clearance requirement, which are associated with each other. The memory part 10k may also include a threshold etc. which is used for the determining part 10j determining the evaluation etc.

The first accepting part 10d extracts the configuration of the user-executable training based on the user information received from the manipulation terminal 20, and presents it to the user. In detail, the first accepting part 10d receives the user information and the execution command of training from the manipulation terminal 20, and extracts the clearance requirement corresponding to the user's identification information included in the user information from the memory part 10k. Moreover, the first accepting part 10d extracts the configuration of the training corresponding to the clearance requirement, and transmits it to the manipulation terminal 20. The user can select from the configurations of the training presented to the output device 31 by the manipulation terminal 20.

Figure 9:
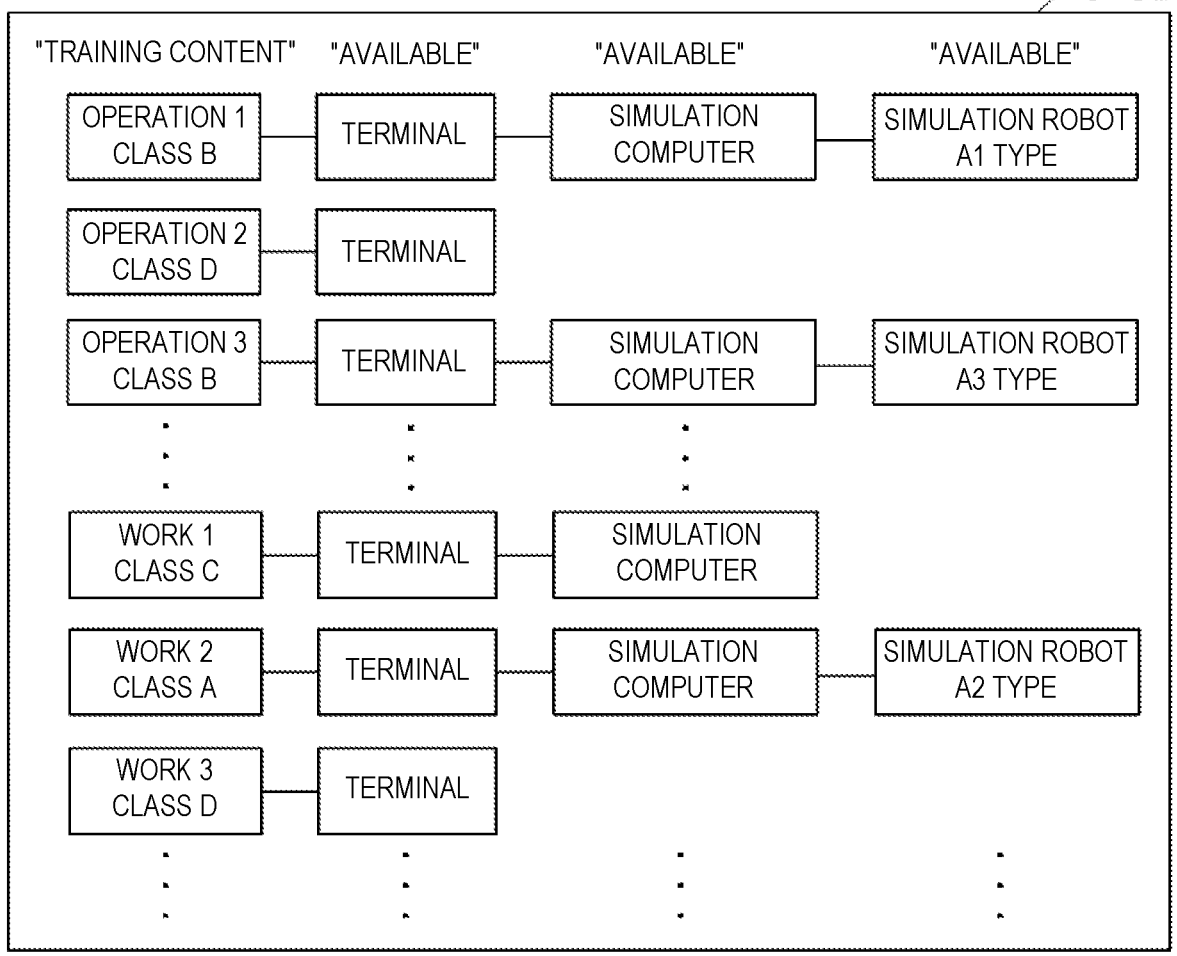
FIG. 9 is a view illustrating one example of a selection screen of a configuration of a training presented by the manipulation terminal according to the embodiment.

For example, the manipulation terminal 20 displays a screen S1 as illustrated in FIG. 9 on the output device 31. FIG. 9 is a view illustrating one example of a selection screen of the configuration of the training presented by the manipulation terminal 20 according to this embodiment. As illustrated in FIG. 9, on the screen S1, for each operation or work, any one of the class "A" to "D" is displayed as the user's clearance requirement, and an icon of the device having the robot model available for the training of each operation or work is further displayed. For example, the operation indication "OPERATION 1; CLASS B" indicates that the user at "CLASS B" or higher can perform the training for "OPERATION 1." For each operation indication, the icon "TERMINAL" indicates the availability of the robot model of the manipulation terminal 20, the icon "SIMULATION COMPUTER" indicates the availability of the robot model of the simulation computer 40, and the icon "SIMULATION ROBOT A1 TYPE" indicates the availability of the simulation robot 50 including the robot 50A1. Therefore, the user selects an operation or work for which the training is executed, and a robot model to be used by selecting the icon of the device. For example, a selection of the icon "TERMINAL" means a selection of the first training, and a selection of the icons "SIMULATION COMPUTER" and "SIMULATION ROBOT" means a selection of the second training.

The determining part 10f determines the configuration of the training to be executed by the user. The determining part 10f receives from the manipulation terminal 20 the configuration of the training selected by the user of the manipulation terminal 20. The determining part 10f determines an execution of the training with the configuration of the training, and outputs a command for executing the content of the training with the configuration of the training to the device having the robot model with the configuration of the training. The determining part 10f connects the manipulation terminal 20 to the device described above.

The first converting part 10g converts, during an execution of the second training, the first information for manipulating the robot model received from the manipulation terminal 20 into the second information for manipulating the robot model of the simulation device 200. The first converting part 10g transmits the second information to the simulation device 200 which is executing the training. For example, when the simulation device 200 is the simulation computer 40, the second information corresponds to information outputted to the simulation computer 40 from the input device 413 to cause the imaginary robot model to perform operation corresponding to the first information. When the simulation device 200 is the simulation robot 50, the second information corresponds to information outputted to the control device 51 from the manipulation device 518 to cause the robot 50A to perform operation corresponding to the first information.

The operation data processing part 10i performs, during an execution of the second training, processing for converting the operation data of the robot model received from the simulation device 200 into the operation data corresponding to the image display of the robot model on the manipulation terminal 20, and transmits it to the manipulation terminal 20.

For example, when the simulation device 200 is the simulation computer 40, the operation data received from the simulation device 200 may be comprised of an image of the robot model, may be comprised of a simplified image indicative of the operation of the robot model, and may be numerical value data, such as a vector and coordinates, indicative of the operation of the robot model. For example, the simplified image may be an image indicative of the frame of the robot model. The converted operation data may be comprised of an image of the robot model displayed on the manipulation terminal 20, may be comprised of an image of the imaginary robot model generated by the simulation computer 40, may be comprised of a simplified image indicative of the operation of the robot model, and may be a numerical value data indicative of the operation of the robot model.

For example, when the simulation device 200 is the simulation robot 50, the operation data received from the simulation device 200 may be comprised of an image data of the robot 50A captured by the imaging device 517. The converted operation data may be comprised of a captured image data of the robot 50A, may be comprised of a simplified image indicative of the operation of the robot 50A by using feature part(s) in the captured image, and may be a numerical value data indicative of the operation of the robot 50A. The simplified image may be an image of the imaginary robot model, and, in this case, it may be an image using CG (Computer Graphics) or animation. The imaginary robot model described above may or may not be similar to the robot 50A.

The determining part 10j evaluates the result of the training performed by the robot model of the manipulation terminal 20 and the simulation device 200. Moreover, the determining part 10j determines the user's learning level based on the evaluation, and further determines the user's rank or class based on the learning level. The determining part 10j transmits at least one information of the evaluation, the learning level, the rank, and the class to the manipulation terminal 20, and the manipulation terminal 20 causes the output device 31 to present the received information. Moreover, the determining part 10*j* stores the evaluation, the learning level, the rank, and the class in the memory part 10*k* as new user information.

Note that the determining part 10*j* may determine the evaluation based on a difference between operation of the robot model of the manipulation terminal 20 and the simulation device 200 and operation of the robot model to be performed in the training, and a relation with a threshold of the difference. The difference may include a difference in the position of each part of the robot model, a difference in time required for the operation, etc. Alternatively, the manipulation terminal 20 and/or the simulation device 200 may evaluate the result of the training and transmit it to the determining part 10*j* so that the determining part 10*j* uses the evaluation.

In the first training and the second training, the second accepting part 10*e* receives the operation data of the robot model from the manipulation terminal 20 and the simulation device 200, and outputs them to the second converting part 10*h*. The operation data of the robot model of the manipulation terminal 20 may be the first information on the robot manipulation. Moreover, the second accepting part 10*e* receives the assisting command inputted into the coaching terminal 60, and outputs it to the second converting part 10*h*.

The second converting part 10*h* converts the operation data of the robot model of the manipulation terminal 20 and the simulation device 200 into operation data corresponding to a presentation of the image display etc. of the operation of the robot model of the coaching terminal 60, and transmits it to the coaching terminal 60. For example, the second converting part 10*h* may convert the operation data so that it is presented similar to the robot model which the user of the manipulation terminal 20 recognizes on the output device 31. Moreover, the second converting part 10*h* converts the assisting command into information corresponding to the presentation of the image display etc. on the manipulation terminal 20, and transmits it to the manipulation terminal 20.

Figure 10:
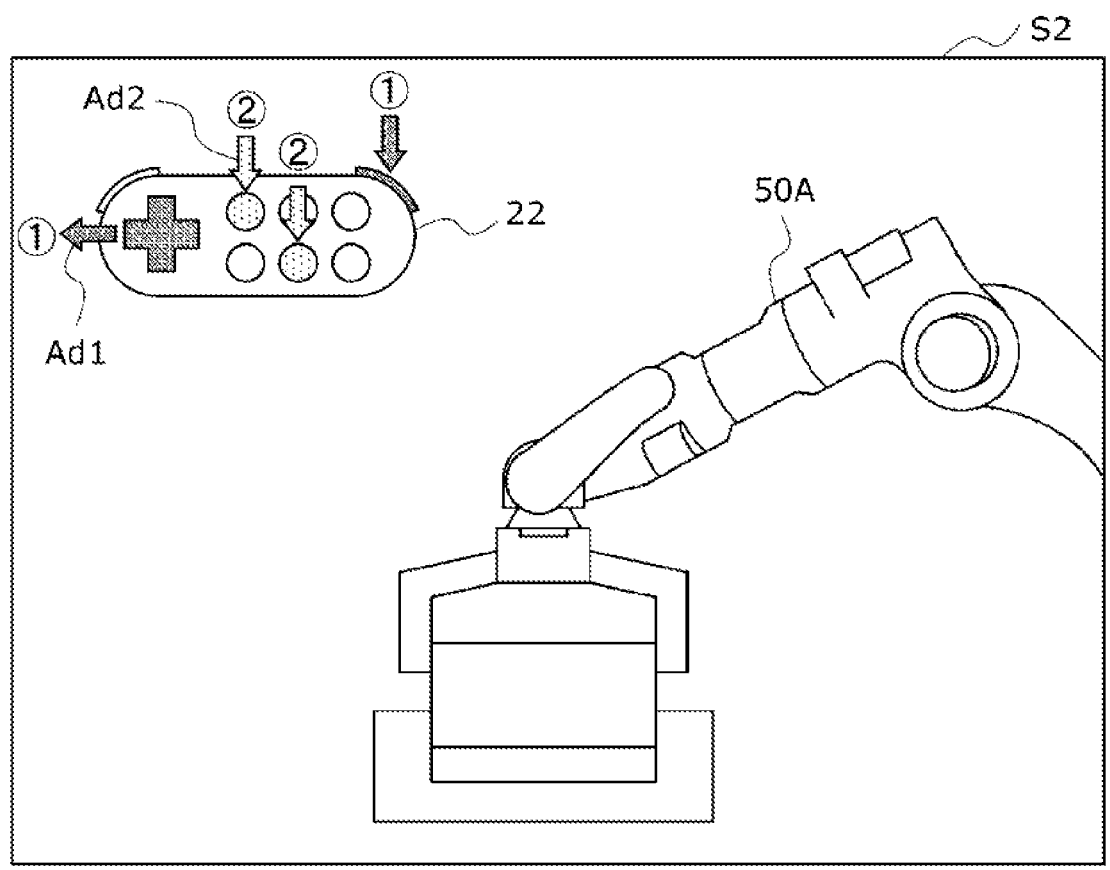
FIG. 10 is a view illustrating one example of a screen of an assisting command presented by the manipulation terminal according to the embodiment.

For example, the manipulation terminal 20 displays the converted assisting command received from the second converting part 10*h* on the output device 31 as a screen S2 as illustrated in FIG. 10. FIG. 10 is a view illustrating one example of the screen of the assisting command presented by the manipulation terminal 20 according to this embodiment. As illustrated in FIG. 10, on the screen S2, an image of the robot model which is manipulated by the user using the manipulation terminal 20, and an image of the manipulation device 22 for indicating the assisting command are displayed. In FIG. 10, the image of the robot model is an image of the actual robot 50A. The assisting command is a command for displaying indexes Ad1 and Ad2 with the manipulation device 22. The index Ad1 explicitly indicates a combination of buttons to be pushed in the manipulation device 22 now, and the index Ad2 explicitly indicates a combination of buttons to be pushed next. A numerical value which accompanies each index is a pressing order.

Figure 11:
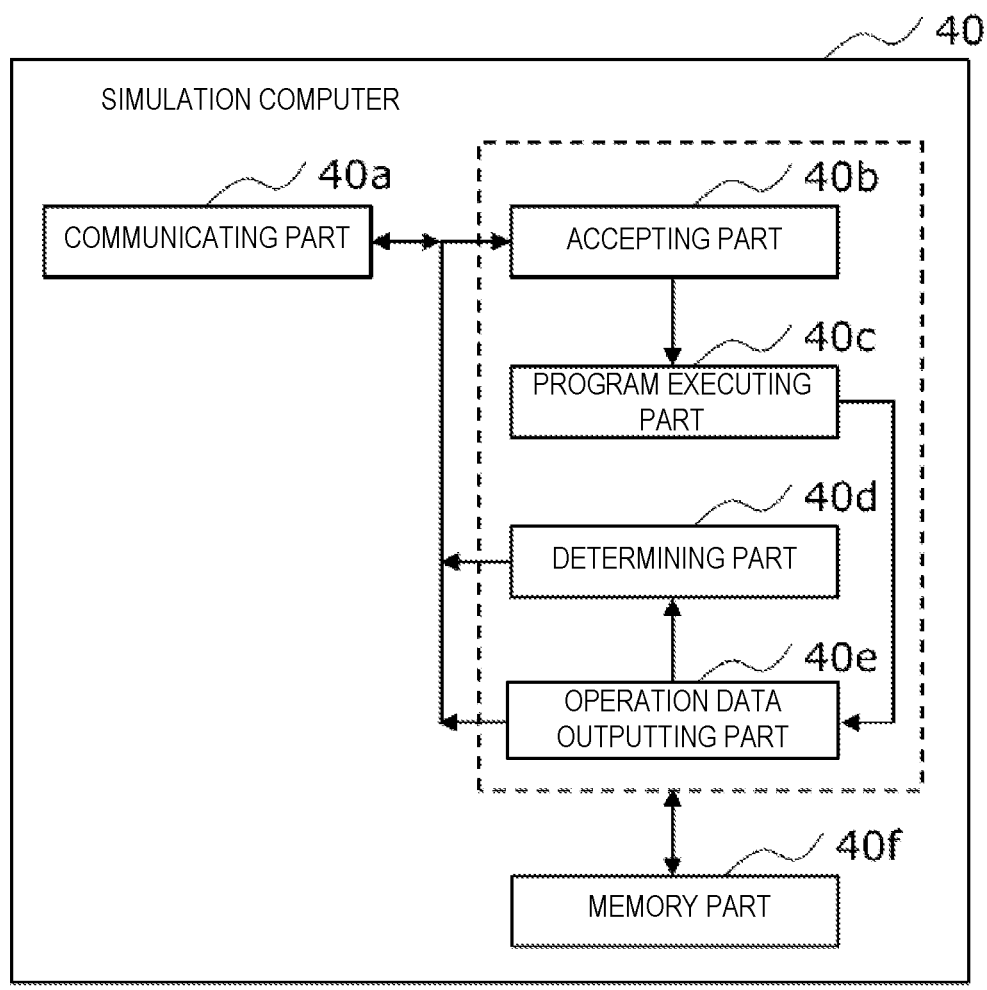
FIG. 11 is a block diagram illustrating one example of a functional configuration of the simulation computer according to the embodiment.

A functional configuration of the simulation computer 40 is described. FIG. 11 is a block diagram illustrating one example of the functional configuration of the simulation computer 40 according to this embodiment. As illustrated in FIG. 11, the simulation computer 40 includes a communicating part 40*a*, an accepting part 40*b*, a program executing part 40*c*, a determining part 40*d*, an operation data outputting part 40*e*, and a memory part 40*f*. Note that not all the components are essential. The function of the communicating part 40*a* is implemented by the network I/F 406 etc. The function of the memory part 40*f* is implemented by the ROM 402 and the memory 404. The functions of the accepting part 40*b*, the program executing part 40*c*, the determining part 40*d*, and the operation data outputting part 40*e* are implemented by the CPU 401, the ROM 402, and the RAM 403.

The communicating part 40*a* communicates with the intermediation device 10 through the communication network 90. The memory part 40*f* stores various information. For example, the memory part 40*f* may store, for the content of each simulation executable by the simulation computer 40, the information on the position of each operation of the robot model executed in the simulation, and the duration. The content of simulation includes the robot's operation or work executed in the simulation. Moreover, the memory part 40*f* may store the threshold used by the determining part 40*d* for the evaluation.

The accepting part 40*b* receives from the intermediation device 10 a command for executing the training which is a command for executing the simulation, and the information on the content of the training to be executed. The accepting part 40*b* extracts the content of simulation corresponding to the received content of training from the memory part 40*f*. The accepting part 40*b* outputs the command for executing the simulation in the extracted content of simulation to the program executing part 40*c*. Moreover, after the start of execution, the accepting part 40*b* receives the second information for operating the imaginary robot model from the first converting part 10*g* of the intermediation device 10, and outputs it to the program executing part 40*c*.

The program executing part 40*c* executes the computer program of the commanded content of simulation. The program is stored in the ROM 402 or the memory 404. The program executing part 40*c* causes the imaginary robot model to execute operation corresponding to the second information, according to the second information and the computer program which are received from the accepting part 40*b*.

The operation data outputting part 40*e* detects the operation result data indicative of the operation result based on the robot model executed by the program executing part 40*c*. This operation result data may include the image of the robot model, the simplified image of the frame etc. of the robot model, the position of each part of the robot model, and time required for moving to the position. Moreover, the operation data outputting part 40*e* generates the operation data based on the operation result data, and transmits it to the intermediation device 10. This operation data is operation data described above about the operation data processing part 10*i* of the intermediation device 10.

The determining part 40*d* evaluates a result of the simulation (i.e., a result of the training) by using the operation data generated by the operation data outputting part 40*e*, and transmits the evaluation to the intermediation device 10. The determining part 40*d* determines the evaluation similar to the determining part 10*j* of the intermediation device 10. Moreover, the determining part 40*d* may determine the user's learning level, rank, and class, and may transmit them to the intermediation device 10.

Figure 12:
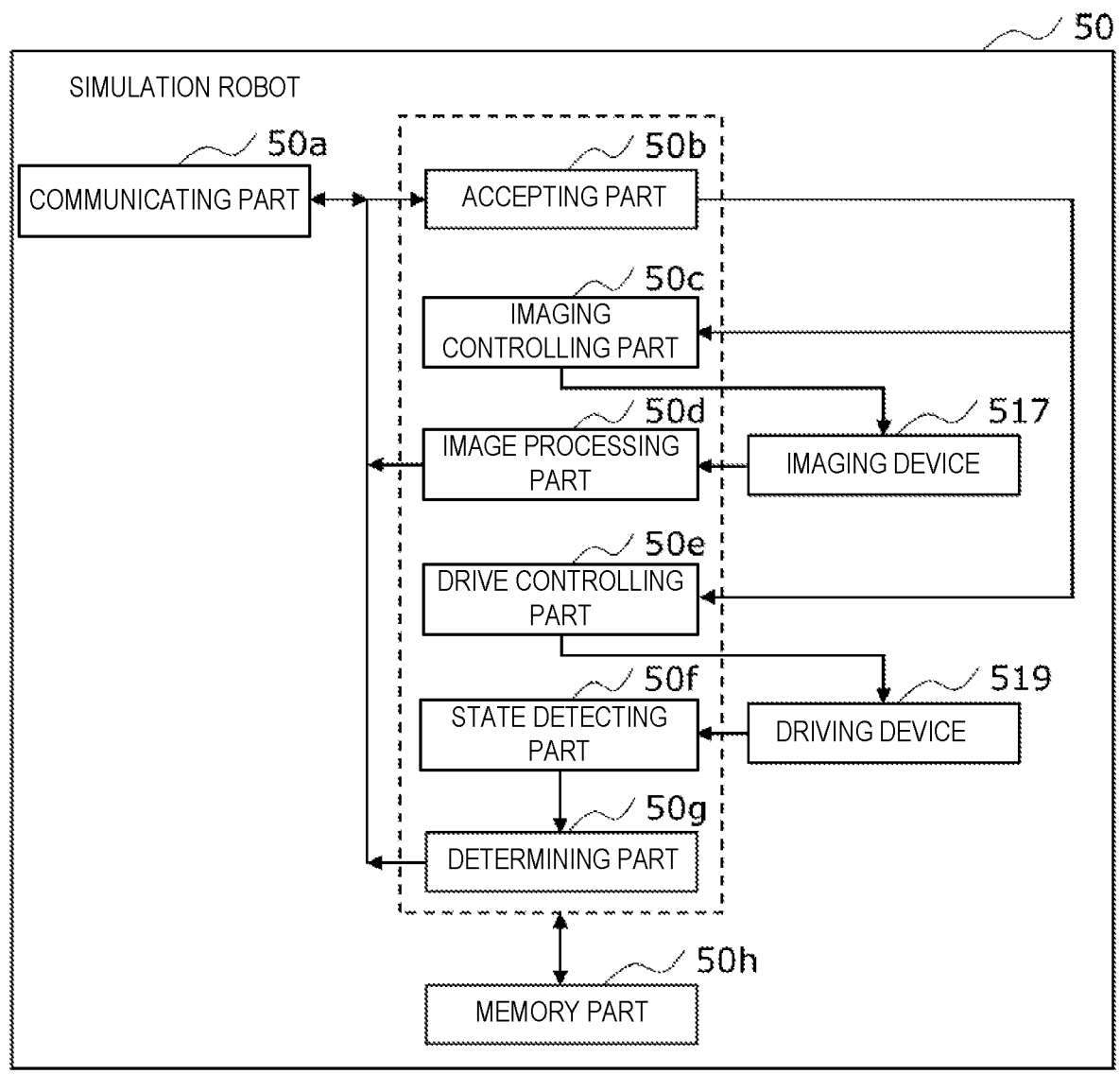
FIG. 12 is a block diagram illustrating one example of a functional configuration of the simulation robot according to the embodiment.

A functional configuration of the simulation robot 50 is described. FIG. 12 is a block diagram illustrating one example of the functional configuration of the simulation robot 50 according to this embodiment. As illustrated in FIG. 12, the simulation robot 50 includes a communicating part 50*a*, an accepting part 50*b*, an imaging controlling part 50*c*, an image processing part 50*d*, a drive controlling part 50*e*, a state detecting part 50*f*, a determining part 50*g*, a memory part 50*h*, the imaging device 517, and the driving device 519. Note that not all the components are essential.

The communicating part 50a, the accepting part 50b, the imaging controlling part 50c, the image processing part 50d, the drive controlling part 50e, the state detecting part 50f, the determining part 50g, and the memory part 50h constitute the control device 51. The function of the communicating part 50a is implemented by the network I/F 506 etc. The function of the memory part 50h is implemented by the ROM 502 and the memory 504. The functions of the accepting part 50b, the imaging controlling part 50c, the image processing part 50d, the drive controlling part 50e, the state detecting part 50f, and the determining part 50g are implemented by the CPU 501, the ROM 502, and the RAM 503.

The communicating part 50a communicates with the intermediation device 10 through the communication network 90. The memory part 50h stores various information. For example, the memory part 50h may store, for the content of each simulation executable by the simulation robot 50, information on the position, applied force, and duration of each operation of the robot 50A executed in the simulation. One example of the applied force is a force of the end effector of the robot pushing or pulling the object. Moreover, the memory part 50h may store the threshold used by the determining part 50g for the evaluation.

The accepting part 50b receives from the intermediation device 10 the command for executing the training which is a command for executing the simulation, and the information on the content of the training to perform. The accepting part 50b extracts the content of simulation corresponding to the received content of training from the memory part 50h. The accepting part 50b outputs the command for executing the simulation in the extracted content of simulation to the imaging controlling part 50c and the drive controlling part 50e. Moreover, after the start of execution, the accepting part 50b receives the second information for operating the robot 50A from the first converting part 10g of the intermediation device 10, and outputs it to the drive controlling part 50e.

The imaging controlling part 50c activates the imaging device 517 for imaging, when the command for executing the simulation is received. The imaging device 517 images the robot 50A (e.g., the end effector), and outputs the captured image to the image processing part 50d. The image processing part 50d transmits the image data of the image received from the imaging device 517 to the intermediation device 10.

The drive controlling part 50e drives the driving device 519 according to the second information received from the accepting part 50b to cause the robot 50A to perform the operation corresponding to the second information.

The state detecting part 50f detects a state of each part of the robot 50A, and outputs the detected results to the determining part 50g. For example, the state detecting part 50f may detect, as this state, a three-dimensional position of each part by detecting a displacement of the movable part of the robot 50A. At this time, the state detecting part 50f may detect the displacement of a movable part of the robot 50A based on a detected value of a rotation sensor provided to the driving device 519. Moreover, the state detecting part 50f may detect an applied force which is a force acting on the end effector of the robot 50A, as the state described above. At this time, the state detecting part 50f may detect the applied force based on a detected value of a force sensor (e.g., an inner force sensor) provided to the end effector. The state detecting part 50f may be provided with a timer, and may detect duration between respective operations of the robot 50A as the state described above. The drive controlling part 50e may use the detected result of the state detecting part 50f as feedback information and control the drive of the driving device 519.

The determining part 50g evaluates the result of the simulation (i.e., the result of the training) based on the detected result of the state detecting part 50f, and transmits the evaluation to the intermediation device 10. The determining part 50g determines the evaluation similar to the determining part 10j of the intermediation device 10. Moreover, the determining part 50g may determine the user's learning level, rank, and class, and may transmit them to the intermediation device 10.

Figure 13:
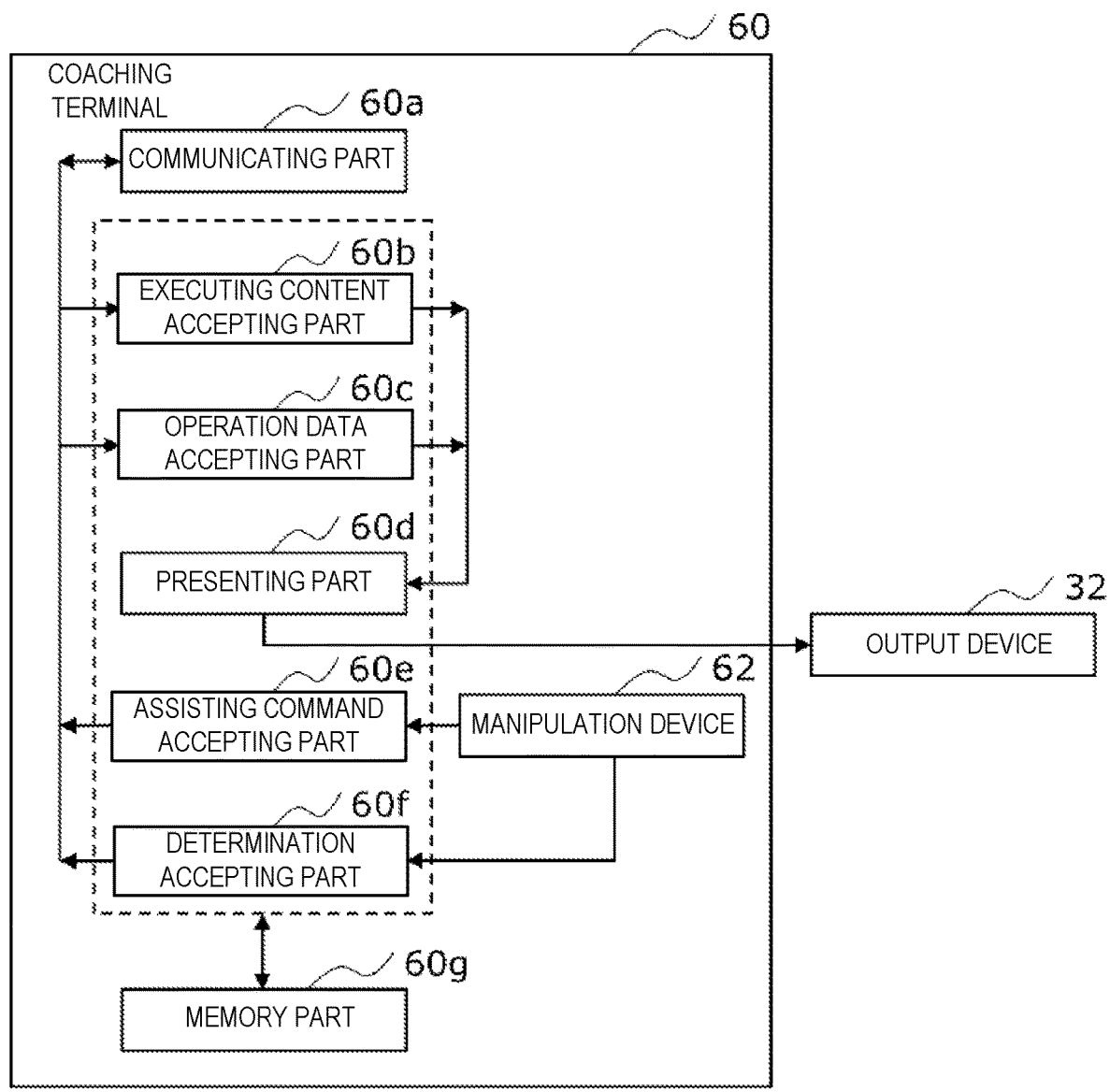
FIG. 13 is a block diagram illustrating one example of a functional configuration of the coaching terminal according to the embodiment.

A functional configuration of the coaching terminal 60 is described. FIG. 13 is a block diagram illustrating one example of the functional configuration of the coaching terminal 60 according to this embodiment. As illustrated in FIG. 13, the coaching terminal 60 includes a communicating part 60a, an executing content accepting part 60b, an operation data accepting part 60c, a presenting part 60d, an assisting command accepting part 60e, a determination accepting part 60f, a memory part 60g, and the manipulation device 62. Note that not all the components are essential.

The function of the communicating part 60a is implemented by the network I/F 606 etc. The function of the memory part 60g is implemented by the ROM 602 and the memory 604. The functions of the executing content accepting part 60b, the operation data accepting part 60c, the presenting part 60d, the assisting command accepting part 60e, and the determination accepting part 60f are implemented by the CPU 601, the ROM 602, and the RAM 603.

The communicating part 60a communicates with the intermediation device 10 through the communication network 90. The memory part 60g stores various information. For example, the memory part 60g may store various contents of the trainings and information accepted by the executing content accepting part 60b.

The executing content accepting part 60b receives from the intermediation device 10 the content of the training executed by the manipulation terminal 20, and outputs it to the presenting part 60d. The operation data accepting part 60c receives the operation data of the robot model from the manipulation terminal 20 and the simulation device 200 through the intermediation device 10, and outputs them to the presenting part 60d. For example, the operation data accepting part 60c acquires the operation data of the robot model of the manipulation terminal 20 in the first training, and acquires the operation data of the robot model of the simulation device 200 in the second training. The operation data of the manipulation terminal 20 may be the first information on the robot manipulation.

The presenting part 60d generates an image etc. of the robot model which operates according to the operation data by using the operation data received from the operation data accepting part 60c, and outputs it to the output device 32. In order to generate the image of the robot model, the presenting part 60d may use the image of the robot model generated by the manipulation terminal 20, may use the image of the robot model generated by the simulation computer 40, or may use the image of the robot 50A captured by the simulation robot 50. Therefore, the coach can confirm the robot model which performs a similar operation to the robot model operated by the user with the manipulation terminal 20. Moreover, the presenting part 60d outputs the content of the training executed by the manipulation terminal 20 to the output device 32 to present it to the coach. At this time, the presenting part 60d may output information presenting the content of the training with a character string or voice, or may output information presenting the content of the training by the image etc. of the robot model.

The assisting command accepting part 60e receives from the manipulation device 62 the assisting command which is the information inputted into the manipulation device 62 by the coach, and transmits it to the intermediation device 10. The assisting command is transmitted to the manipulation terminal 20 from the intermediation device 10. The assisting command is information inputted into the manipulation device 62 by the coach for the robot model presented on the output device 32, in order to appropriately assist, lead, or guide the operation of the robot model. For example, the coach may input a proper robot manipulation into the manipulation device 62, and the assisting command accepting part 60e may generate the assisting command by using the inputted information.

The determination accepting part 60f accepts the evaluation of the result of operation of the robot model presented on the output device 32. The determination accepting part 60f receives the evaluation inputted into the manipulation device 62 by the coach, and transmits the evaluation to the intermediation device 10 as the evaluation of the training. Therefore, the presentation of the evaluation by the coach to the user becomes possible.

<Operation of Training System>

Figure 14A:
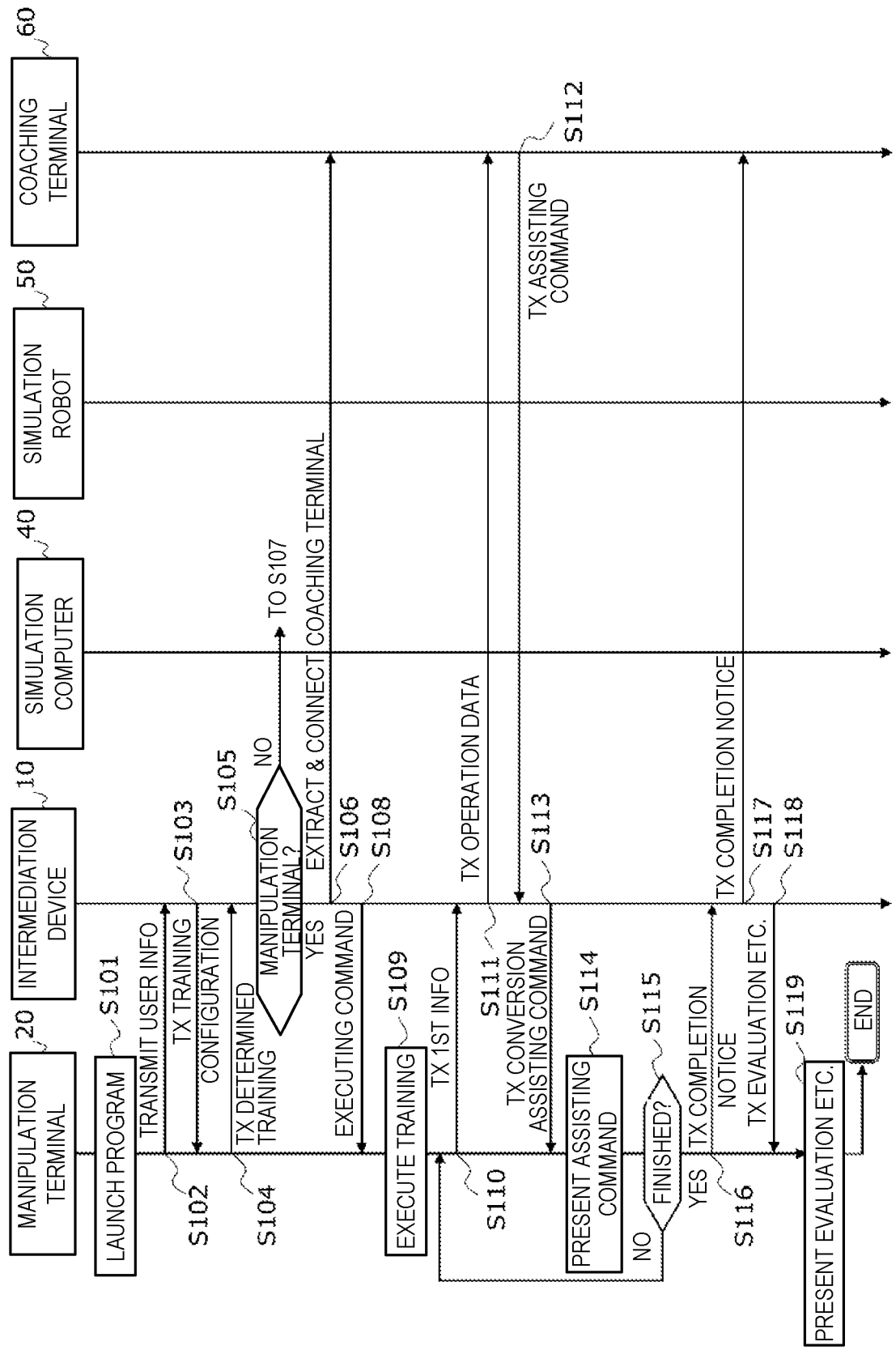
FIG. 14A is a sequence diagram illustrating one example of a flow of operation of the training system according to the embodiment.
Figure 14B:
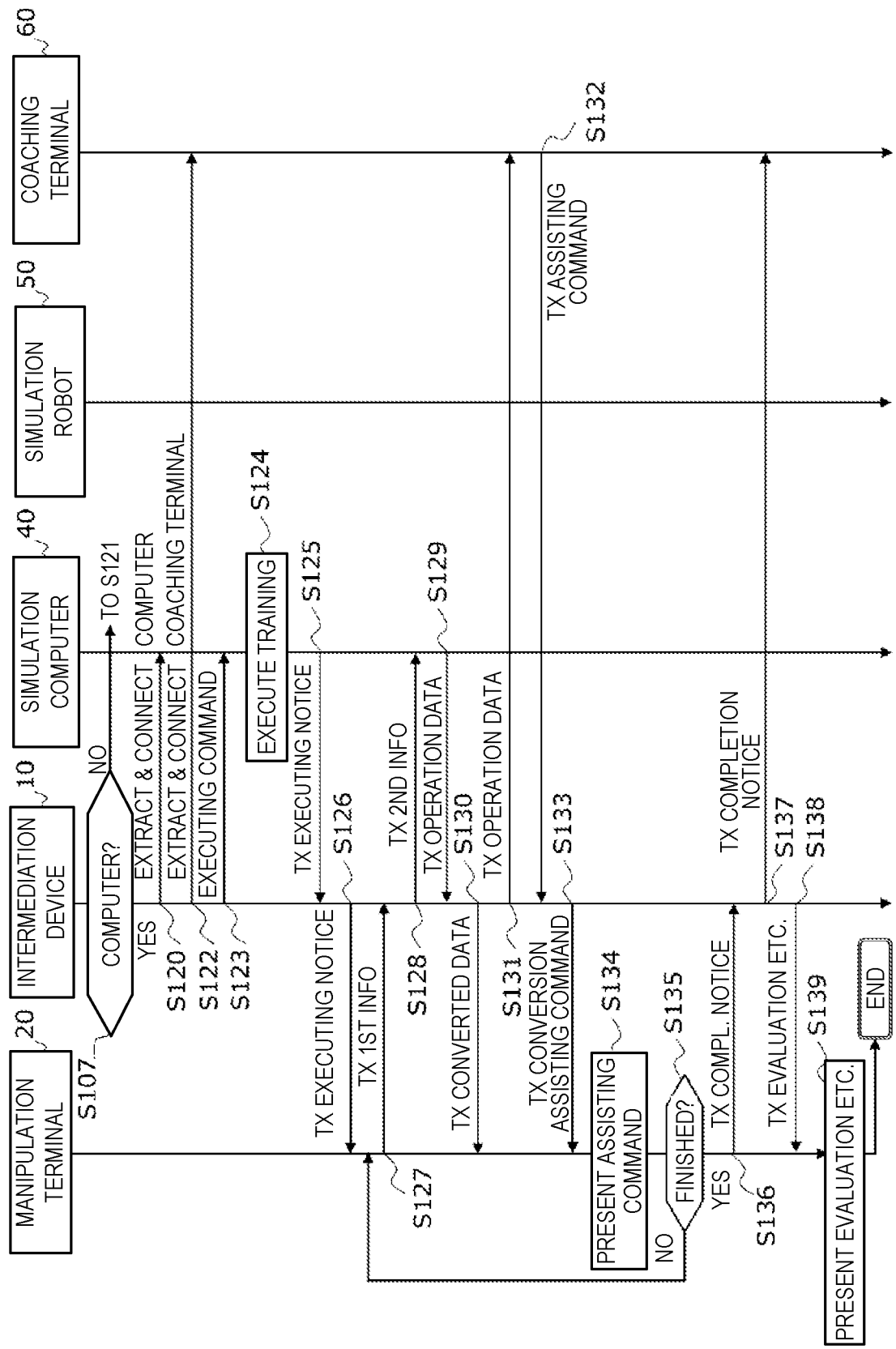
FIG. 14B is a sequence diagram illustrating one example of the flow of operation of the training system according to the embodiment.
Figure 14C:
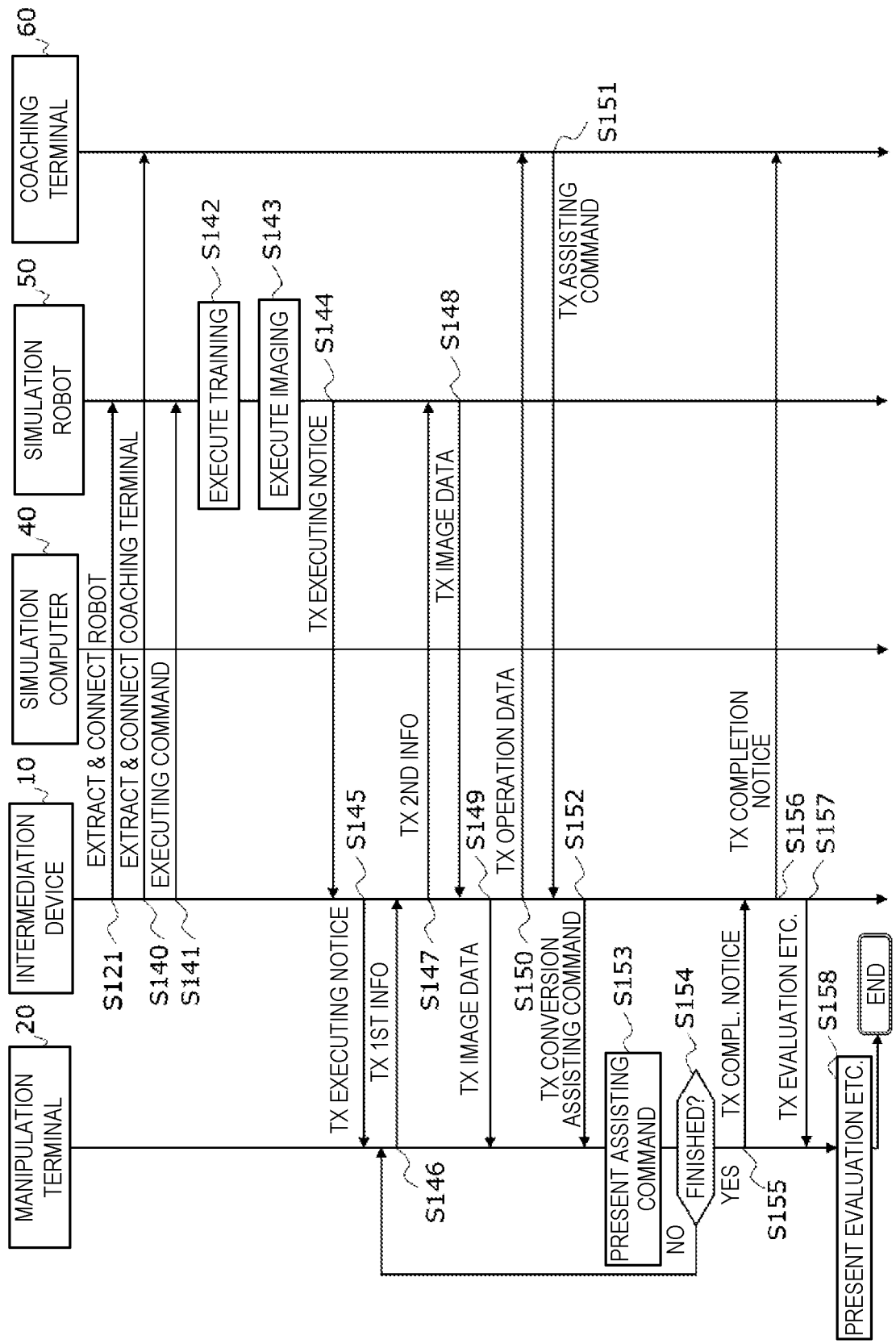
FIG. 14C is a sequence diagram illustrating one example of the flow of operation of the training system according to the embodiment.

Operation of the training system 1 according to this embodiment is described. FIGS. 14A-14C are a sequence diagram illustrating one example of a flow of the operation of the training system 1 according to this embodiment. In the following, one example in which the robot manipulation using the coaching terminal 60 is assisted is described.

As illustrated in FIG. 14A, the user launches the game program of the training for the robot manipulation in the manipulation terminal 20 (Step S101). Next, the user inputs into the manipulation terminal 20 the identification information etc. of the user which is the user information, and the manipulation terminal 20 transmits the identification information etc. to the intermediation device 10 (Step S102). That is, the user logs in to the game of training. The user's identification information is registered in the intermediation device 10 in advance.

Next, the intermediation device 10 authenticates the received user's identification information, extracts the clearance requirement of training corresponding to the identification information, and extracts the configuration of the training corresponding to the extracted clearance requirement. Then, the intermediation device 10 transmits the extracted configuration of the training to the manipulation terminal 20 as a configuration of a training executable by the user (Step S103). The configuration of the training is a combination of the content of the training, and the device having the robot model which executes the content of the training.

Next, the user uses the manipulation terminal 20, for example, to determine a configuration to be executed from the configurations of executable trainings displayed on the output device 31, as illustrated in FIG. 9. The manipulation terminal 20 transmits the determined configuration of training to the intermediation device 10 (Step S104).

Next, the intermediation device 10 determines whether the device having the robot model with the received configuration of the training is the manipulation terminal 20 (Step S105). If it is the manipulation terminal 20 (Yes at Step S105), the intermediation device 10 transits to Step S106, and if it is not the manipulation terminal 20 (No at Step S105), the intermediation device 10 transits to Step S107.

At Step S106, the intermediation device 10 extracts the coaching terminal 60 which can perform the assisting movement for the configuration of the training received at Step S104, from the coaching terminals 60 which can be connected by the intermediation device 10, and connects the coaching terminal 60 with the manipulation terminal 20.

Next, the intermediation device 10 transmits the command for executing the training to the manipulation terminal 20 (Step S108). Next, the manipulation terminal 20 starts the execution of the training (Step S109). Then, the manipulation terminal 20 transmits to the intermediation device 10, during the execution of the training, the first information indicative of the manipulation inputted by the user (Step S110).

The intermediation device 10 converts the first information into the operation data indicative of the operation of the robot model, and transmits it to the coaching terminal 60 (Step S111). The coaching terminal 60 presents the coach through the output device 32, the robot model which operates corresponding to the operation data. Note that the intermediation device 10 may receive, as the first information, image data of the robot model which the manipulation terminal 20 displays on the output device 31, and may transmit the image data to the coaching terminal 60. The coaching terminal 60 may display the received image data on the output device 32. Moreover, when the assisting command of the robot manipulation for rationalizing the operation of the robot model is inputted by the coach, the coaching terminal 60 transmits the assisting command to the intermediation device 10 (Step S112).

The intermediation device 10 converts the assisting command received from the coaching terminal into a conversion assisting command which is information adapted for the manipulation terminal 20, and transmits it to the manipulation terminal 20 (Step S113). The manipulation terminal 20 generates presentation data of the image data etc. which assists the robot manipulation of the user to a proper manipulation, for example, as illustrated in FIG. 10, based on the received conversion assisting command, and causes the output device 31 to present the data (Step S114).

Next, the manipulation terminal 20 determines whether all the contents of training under execution is finished (Step S115). If finished (Yes at Step S115), the manipulation terminal 20 transits to Step S116, and if not finished (No at Step S115), it returns to Step S110.

At Step S116, the manipulation terminal 20 transmits a notice of completion of the training to the intermediation device 10, and the intermediation device 10 then transmits the notice of completion of the training to the coaching terminal 60 at Step S117. The coach of the coaching terminal 60 cuts the connection from the intermediation device 10. Note that the coach may generate the evaluation of the result of the training and transmit it to the intermediation device 10, by using the coaching terminal 60.

Next, at Step S118, the intermediation device 10 determines the evaluation of the result of the training, and the user's learning level, rank, and class based on the result of the training, and transmits at least one of these to the manipulation terminal 20. Note that the intermediation device 10 may generate the evaluation of the result of the training by itself, or may acquire it from the coaching terminal 60, or may acquire the evaluation of the result of the training which is generated by the manipulation terminal 20. The intermediation device 10 registers into itself the evaluation result, and the learning level, the rank, and the class as new user information. Next, the manipulation terminal 20 outputs the received evaluation result, learning level, rank, and class to the output device 31 to present it to the user (Step S119). Then, by the user suspending the manipulation terminal 20, the manipulation terminal 20 ends the game program of the training.

Moreover, as illustrated in FIG. 14B, at Step S107, the intermediation device 10 determines whether the device having the robot model with the configuration of the training which is received at Step S104 is the simulation computer 40. If it is the simulation computer 40 (Yes at Step S107), the intermediation device 10 transits to Step S120, and if it is not the simulation computer 40 (No at Step S107), the intermediation device 10 transits to Step S121.

At Step S120, the intermediation device 10 extracts the simulation computer 40, which is executable of the content of the training included in the configuration of the training received at Step S104, from the simulation computers 40 which can be connected by the intermediation device 10, and connects the simulation computer 40 to the manipulation terminal 20. Moreover, at Step S122, the intermediation device 10 extracts the coaching terminal 60 similar to Step S106, and connects with the coaching terminal 60.

Next, the intermediation device 10 transmits a command for executing the content of the training to the simulation computer 40 (Step S123). Next, the simulation computer 40 performs the commanded content of training (Step S124). The simulation computer 40 transmits the notice indicative of an execution of the training to the intermediation device 10 (Step S125), and the intermediation device 10 further transmits the notice to the manipulation terminal 20 (Step S126).

During the execution of the training, the manipulation terminal 20 transmits the first information to the intermediation device 10 (Step S127). Moreover, the intermediation device 10 converts the first information into the second information for operating the imaginary robot model of the simulation computer 40, and transmits it to the simulation computer 40 (Step S128). The simulation computer 40 causes the robot model to operate according to the second information, and transmits the operation data of the robot model to the intermediation device 10 (Step S129). The intermediation device 10 converts the received operation data into operation data corresponding to the presentation of the image display etc. of the robot model on the manipulation terminal 20, and transmits it to the manipulation terminal 20 (Step S130). The manipulation terminal 20 causes the output device 31 to present the image etc. of the robot model which executes the operation corresponding to the received operation data. Note that the simulation computer 40 may transmit, as the operation data, the image data of the imaginary robot model to the intermediation device 10, and the intermediation device 10 may transmit the received image data to the manipulation terminal 20. The manipulation terminal 20 may display the received image data on the output device 31.

Moreover, the intermediation device 10 transmits the operation data received at Step S129 to the coaching terminal 60 (Step S131). If the assisting command is inputted by the coach, for the operation of the robot model presented to the output device 32 based on the operation data, the coaching terminal 60 transmits the assisting command to the intermediation device 10 (Step S132). The intermediation device 10 converts the assisting command received from the coaching terminal into the conversion assisting command, and transmits it to the manipulation terminal 20 (Step S133). The manipulation terminal 20 causes the output device 31 to perform a presentation for assisting the robot manipulation of the user based on the received conversion assisting command (Step S134). Note that the intermediation device 10 may receive, as the operation data, the image data of the imaginary robot model from the simulation computer 40, and may transmit it to the coaching terminal 60. The coaching terminal 60 may display the received image data on the output device 32.

Next, if all the contents of the training under execution are finished (Yes at Step S135), the manipulation terminal 20 transits to Step S136, and if not finished (No at Step S135), it returns to Step S127. The manipulation terminal 20 etc. performs the processings of Steps S136-S139 similar to Steps S116-S119.

Moreover, as illustrated in FIG. 14C, at Step S121, the intermediation device 10 extracts the simulation robot 50 including the robot 50A which is executable of the content of the training included in the configuration of the training received at Step S104, from the simulation robots 50 which can be connected by the intermediation device 10, and connects the simulation robot 50 to the manipulation terminal 20. Moreover, at Step S140, the intermediation device 10 extracts the coaching terminal 60 similar to Step S106, and connects it with the coaching terminal 60.

Next, the intermediation device 10 transmits the command for executing the content of the training to the simulation robot 50 (Step S141). Next, the simulation robot 50 executes the commanded content of training (Step S142). Moreover, the simulation robot 50 causes the imaging device 517 to image the robot 50A (Step S143). Next, the simulation robot 50 transmits a notice indicative of an execution of the training to the intermediation device 10 (Step S144), and the intermediation device 10 further transmits the notice to the manipulation terminal 20 (Step S145).

During the execution of the training, the manipulation terminal 20 transmits the first information to the intermediation device 10 (Step S146), and the intermediation device 10 converts the first information into the second information for operating the robot 50A and transmits it to the simulation robot 50 (Step S147). The simulation robot 50 operates the robot 50A according to the second information, and detects a state of each part of the robot 50A. Then, the simulation robot 50 transmits the image data captured by the imaging device 517 to the intermediation device 10 (Step S148). The intermediation device 10 transmits the received image data to the manipulation terminal 20 (Step S149). The manipulation terminal 20 causes the output device 31 to present the image etc. of the received image data.

Moreover, the intermediation device 10 transmits the image data received at Step S148 to the coaching terminal 60 as the operation data (Step S150). When the coach visually recognizes the image of the image data presented on the output device 32 and inputs the assisting command into the coaching terminal 60, the coaching terminal 60 transmits the assisting command to the intermediation device 10 (Step S151). The intermediation device 10 converts the assisting command received from the coaching terminals into the conversion assisting command, and transmits it to the manipulation terminal 20 (Step S152). The manipulation terminal 20 causes the output device 31 to perform a presentation for assisting the robot manipulation of the user based on the received conversion assisting command (Step S153).

Next, if all the contents of training under execution are finished (Yes at Step S154), the manipulation terminal 20 transits to Step S155, and if not finished (No at Step S154), it returns to Step S146. The manipulation terminal 20 etc. performs the processings of Steps S155-S158 similar to Steps S116-S119.

By the processings of Steps S101-S158, the user can use the manipulation terminal 20 to execute the training for the robot manipulation using the robot model of any of the manipulation terminal 20, the simulation computer 40, and the simulation robot 50. Moreover, the user can receive assistance of the robot manipulation by the coach in all the trainings. Note that, in the examples of FIGS. 14A-14C, the assistance is received for all the trainings through the coach's coaching terminal 60, the assistance is not essential, and, for example, it may be arbitrarily selectable by the user. If the assistance is not performed, in FIGS. 14A-14C, the processing relevant to the coaching terminal 60 may be omitted. Thus, by performing the training for the robot manipulation using the manipulation terminal 20, the user can improve his/her level of skill of the robot manipulation. For example, in an environment in which the manipulation terminal 20 is connected with the actual robot through the communication network 90, and the robot manipulation is possible using the manipulation terminal 20, the user becomes possible to perform an actual work with the actual robot by using the manipulation terminal 20, while being located at a remote place.

<Effects etc.>

In the training system 1 according to the above embodiment, the information processing device 100 of the intermediation device 10 as the training processing device manages the training for the robot manipulation using the manipulation terminal 20. The information processing device 100 communicates the information with the manipulation terminal 20 through the communication network 90, receives the first information which is the information on the robot manipulation inputted into the manipulation terminal 20 during the execution of the computer program for training of the robot manipulation on the manipulation terminal 20, and manages the training based on the first information. Note that, for example, the robot manipulation may be a manipulation for causing the robot to perform a work.

According to the above configuration, the information processing device 100 enables the training for the robot manipulation using the manipulation terminal 20. Moreover, as long as it is in an environment in which the user of the manipulation terminal 20 can access the communication network 90, he/she can receive the management of training from the information processing device 100, no matter where he/she is located. Moreover, by having the communication network 90 therebetween, a plurality of manipulation terminals 20 can be simultaneously connected to the information processing device 100, and they can receive the management of training from the information processing device 100. Thus, the information processing device 100 enables various users to manipulate the robot by giving him/her the training for the robot manipulation.

Moreover, the information processing device 100 according to this embodiment may evaluate the result of the training, and may register the evaluation of the result of the training as a user evaluation which is an evaluation of the user who operates the manipulation terminal 20. According to the above configuration, the information processing device 100 registers the evaluation of the result of the training as the user evaluation of the manipulation terminal 20. Thus, the utilization of the registered user evaluation is possible. For example, the information processing device 100 can present the user the registered user evaluation, for example, when the training is performed. Therefore, the user can easily determine the configuration of the training to perform according to his/her own user evaluation. Moreover, when the user manipulates the actual robot, the determination of the robot and the content of work suitable for the user becomes possible based on the user evaluation.

Moreover, the information processing device 100 according to this embodiment may determine the training which is executable by the user corresponding to the user evaluation, based on the registered user evaluation, and it may cause the manipulation terminal 20 to present information on the determined training. According to the above configuration, the user or a provider of the training (e.g., the intermediation device 10) can determine the training for the robot manipulation which is suitable for or is executable by the user.

Moreover, the information processing device 100 according to this embodiment may assist for the robot manipulation inputted into the manipulation terminal 20 to cause the coaching terminal 60 which coaches the training to present the first information, may receive the assisting command for assisting the robot manipulation inputted into the coaching terminal 60 in response to the presented first information, and may cause the manipulation terminal 20 to present the assisting command. According to the above configuration, the coach of the robot manipulation can confirm, through the coaching terminal 60, the first information which is information on the robot manipulation by the user. Moreover, the coach can input the assisting command of the robot manipulation into the coaching terminal 60 and send it to the manipulation terminal 20, while performing the confirmation described above. The user is able to receive the training of the robot manipulation while confirming the assisting command presented from the manipulation terminal 20, that is, he/she can receive the training while being assisted.

Moreover, in the training system 1 according to this embodiment, the manipulation terminal 20 may be connected with the coaching terminal 60 through the communication network 90. According to the above configuration, the user of the manipulation terminal 20 and the coach of the coaching terminal 60 can perform the training and the assistance, no matter where they are located, as long as it is in the environment in which they can access the communication network 90.

Moreover, in the training system 1 according to this embodiment, the manipulation terminal 20 may be at least any of a game machine, a game controller, a remote controller dedicated for the robot, a personal data assistant, a smart device, and a personal computer. According to the above configuration, the training using the various manipulation terminals 20 becomes possible.

Moreover, the information processing device 100 according to this embodiment may convert the first information into the second information for manipulating the robot model of the simulation device 200 which executes the simulation for causing the robot model to perform the simulated operation, may cause the simulation device 200 to operate according to the second information, and may present to the manipulation terminal 20 information on the operation of the robot model of the simulation device 200 which operates according to the second information. Note that the manipulation terminal 20 may be connected with the simulation device 200 through the communication network 90.

According to the above configuration, the information processing device 100 converts the first information corresponding to the manipulation inputted into the manipulation terminal 20 into the second information, and causes the simulation device 200 to operate according to the second information so that the robot model of the simulation device 200 is caused to perform operation corresponding to the manipulation. Therefore, the user can perform the training of the robot manipulation at the remote place from the simulation device 200, by using the manipulation terminal 20 and the simulation device 200. Moreover, since the information communicating between the manipulation terminal 20 and the simulation device 200 is converted into information on a format adapted for each of the manipulation terminal 20 and the simulation device 200, the user can use, for example, his/her own manipulation terminal 20 which the user is got used to using it. Therefore, the user can easily perform the input of the robot manipulation into the simulation device 200, and therefore, he/she can easily accept the training. Moreover, various manipulation terminals 20 are connectable with the simulation device 200 by the manipulation terminals 20 being connected with the simulation device 200 through the communication network 90. Therefore, various users can access the simulation device 200 through the manipulation terminal 20 and can perform the training of the robot manipulation, and therefore, he/she becomes capable of manipulating the robot.

Moreover, the information processing device 100 according to this embodiment may accept, from the manipulation terminal 20, a request of training which is selected from the first training in which the robot model which functions on the computer program executed on the manipulation terminal 20 is used, and the second training in which the simulation device 200 is used, and may determine an execution of the selected training According to the above configuration, the user of the manipulation terminal 20 can select the training from the first training and the second training and perform the selected training. The second training using the simulation device 200 requires a more-precise and higher-accuracy robot manipulation than the first training. The user can select the training according to his/her own learning level.

Moreover, the information processing device 100 according to this embodiment enables the execution of training using the simulation computer 40 which causes the imaginary robot model to perform the simulated operation, and the manipulation terminal 20, and may cause the manipulation terminal 20 to present information on the operation of the imaginary robot model generated by the simulation computer 40. According to the above configuration, the user can perform the training using the simulation of the simulation computer 40.

Moreover, the information processing device 100 according to this embodiment enables the execution of training using the simulation robot 50 which causes the actual robot 50A to perform the simulated operation as the robot model, and the manipulation terminal 20, and may cause the manipulation terminal 20 to present information on the image of the robot 50A captured by the imaging device 517 as the information on the operation of the robot model. According to the above configuration, the user can perform the training using the simulation which uses the actual robot 50A. Moreover, the user can perform the training, while visually recognizing the image of the actual robot 50A.

Moreover, the information processing device 100 according to this embodiment may convert the image of the actual robot 50A into the image of the imaginary robot model, and may cause the manipulation terminal 20 to present the information on the operation of the imaginary robot model in the converted image. For example, the image of the imaginary robot model may be an image which uses CG or animation. According to the above configuration, the image presented to the user by the manipulation terminal 20 can be converted into the image familiar with the user. Therefore, the user becomes more familiar with the training.

Moreover, the intermediation device 10 according to this embodiment may be provided with the information processing device 100 according to this embodiment, and may mediate the manipulation terminal 20 and the coaching terminal 60 through the communication network 90. Moreover, the intermediation device 10 according to this embodiment may be provided with the information processing device 100 according to this embodiment, and may mediate the manipulation terminal 20 and the simulation device 200 through the communication network 90. Moreover, the intermediation device 10 according to this embodiment may be provided with the information processing device 100 according to this embodiment, and may mediate the manipulation terminal 20, the simulation device 200, and the coaching terminal 60 through the communication network 90. Similar effects to the information processing device 100 according to this embodiment can be acquired also in any of the above configurations.

Moreover, the training system 1 according to this embodiment may include the information processing device 100 according to this embodiment, the coaching terminal 60, and the intermediation device 10 which mediates the manipulation terminal 20 and the coaching terminal 60 through the communication network 90. Moreover, the training system 1 according to this embodiment may include the information processing device 100 according to this embodiment, the simulation device 200, and the intermediation device 10 which mediates between the manipulation terminal 20 and the simulation device 200 through the communication network 90. Moreover, the training system 1 according to this embodiment may be further provided with the coaching terminal 60, and the intermediation device 10 may mediate the manipulation terminal 20, the simulation device 200, and the coaching terminal 60 through the communication network 90. Moreover, the training system 1 according to this embodiment may be provided with the manipulation terminal 20. Similar effects to the information processing device 100 according to this embodiment can be acquired also in any of the above configurations.

Other Embodiments

As described above, although the example of the embodiment of the present disclosure is described, the present disclosure is not limited to the above embodiment. That is, various modifications and improvements are possible within the scope of the present disclosure. For example, various modifications made to the embodiment, and forms established by combining the components in different embodiments are also encompassed within the scope of the present disclosure.

For example, although in the above embodiment the information processing device 100 is mounted on the intermediation device 10, the present disclosure is not limited to this configuration. For example, the information processing device 100 may be mounted on any of the manipulation terminal 20, the simulation device 200, and the coaching terminal 60. Moreover, the information processing device 100 may be dividedly mounted on two or more devices. For example, a first information processing device and a second information processing device having parts of the function of the information processing device 100 may be mounted on two of the intermediation device 10, the manipulation terminal 20, the simulation device 200, and the coaching terminals 60. Alternatively, first to third information processing devices having parts of the function of information processing device 100 may be mounted on the intermediation device 10, the manipulation terminal 20, the simulation device 200, and the coaching terminals 60. Alternatively, first to fourth information processing devices having parts of the function of the information processing device 100 may be mounted on the intermediation device 10, the manipulation terminal 20, the simulation device 200, and the coaching terminal 60, respectively.

Moreover, although the training system 1 according to the embodiment is provided with the manipulation terminal 20, the intermediation device 10, the simulation device 200, and the coaching terminal 60, the present disclosure is not limited to this configuration. For example, the training system 1 may not be provided with the intermediation device 10.

Moreover, although in the training system 1 according to the embodiment the simulation computer 40 and the simulation robot 50 cause the robot model to operate according to the computer program and data which are set in advance, it is not limited to this configuration. For example, the simulation computer 40 and the simulation robot 50 may use a digital-twin environment. In this case, the simulation computer 40 and the simulation robot 50 may operate, for example, using various data stored on the cloud (i.e., big data). For example, the data may include data obtained by various users performing various trainings using various simulation computers 40 and simulation robots 50, and data obtained by actually performing various works using various robots.

Moreover, the present disclosure may be a training processing method. For example, the training processing method according to one aspect of the present disclosure accepts, through the communication network, the first information which is the information on the robot manipulation inputted into the manipulation terminal during the execution, on the manipulation terminal, of the computer program for training the robot manipulation using the manipulation terminal, and manages the training based on the first information. According to this method, similar effects to the information processing device 100 etc. can be acquired. Such a training processing method may be implemented by circuitry such as a CPU and an LSI, an IC card, or a sole module.

Moreover, the present disclosure may be a program for implementing the training processing method, or may be a non-transitory computer-readable recording medium where the program described above is recorded. Moreover, the program described above can be, of course, circulated through a transmission medium, such as the Internet.

Moreover, the numerical values, such as ordinal numbers and quantities, used in the above description are to illustrate the technology of the present disclosure concretely, and therefore, the present disclosure is not limited to the illustrated numerical values. Moreover, the connecting relations between the components are to illustrate the technology of the present disclosure concretely, and therefore, the connecting relations for implementing the functions of the present disclosure are not limited to these relations.

Moreover, the division of the blocks in the functional block diagram is one example, and therefore, a plurality of blocks may be implemented as one block, one block may be divided into a plurality of blocks, and/or a part of the function may be moved to another block. Moreover, the functions of the plurality of blocks which have similar functions may be processed parallely or in a time-divided fashion by sole hardware or software.

DESCRIPTION OF REFERENCE CHARACTERS

1 Training System
10 Intermediation Device
20 Manipulation Terminal
50 Simulation Robot
50A, 50A1-50An Robot
60 Coaching Terminal
90 Communication Network
100 Information Processing Device (Training Processing Device)
200 Simulation Device
517 Imaging Device

The invention claimed is:

1. A training processing device configured to manage a training for a robot manipulation using a manipulation terminal, wherein the training processing device is adapted to:
communicate information with the manipulation terminal through a communication network;
accept first information that is information on the robot manipulation inputted into the manipulation terminal, while the manipulation terminal executing a computer program for the training of the robot manipulation;
manage the training based on the first information;
convert the first information into second information for manipulating a robot model of a simulation device configured to execute a simulation for causing the robot model to perform a simulated operation;
operate the simulation device according to the second information; and
cause the manipulation terminal to present information on the operation of the robot model of the simulation device configured to operate according to the second information.

2. The training processing device of claim 1, wherein the training processing device is adapted to:
assist the robot manipulation inputted into the manipulation terminal to cause a coaching terminal configured to coach the training to present operation of a robot model according to the first information;
accept an assisting command for assisting the robot manipulation inputted into the coaching terminal, in the presented operation of the robot model; and
cause the manipulation terminal to present the assisting command.

3. The training processing device of claim 2, wherein the manipulation terminal is connected with the coaching terminal through a communication network.

4. The training processing device of claim 1, wherein the training processing device is adapted to:
evaluate a result of the training based on the first information; and
register the evaluation of the result of the training as a user evaluation that is an evaluation of the user who operates the manipulation terminal.

5. The training processing device of claim 4, wherein the training processing device is adapted to:
determine a training executable by the user corresponding to the user evaluation based on the registered user evaluation; and
cause the manipulation terminal to present information on the determined training.

6. The training processing device of claim 1, wherein the manipulation terminal is at least any of a game machine, a game controller, a remote controller dedicated for a robot, a personal data assistant (PDA), a smart device, and a personal computer.

7. The training processing device of claim 1, wherein the robot manipulation is a manipulation for causing a robot to perform a work.

8. The training processing device of claim 1, wherein the training processing device is adapted to:
- accept, from the manipulation terminal, a request of a training selected from a first training using the robot model configured to function on a computer program executed on the manipulation terminal, and a second training using the simulation device; and
- determine an execution of the selected training.

9. The training processing device of claim 1, wherein the training processing device is adapted to:
- enable an execution of the training using the simulation device as a computer device configured to cause an imaginary robot model to perform a simulated operation, and the manipulation terminal; and
- cause the manipulation terminal to present information on the operation of the imaginary robot model generated by the simulation device.

10. The training processing device of claim 1, wherein the training processing device is adapted to:
- enable an execution of the training using the simulation device configured to cause an actual robot as the robot model to perform a simulated operation, and the manipulation terminal; and
- cause the manipulation terminal to present information on an image of the robot captured by an imaging device as the information on the operation of the robot model.

11. The training processing device of claim 10, wherein the training processing device is adapted to:
- convert the image of the robot into an image of an imaginary robot model; and
- cause the manipulation terminal to present information on the operation of the imaginary robot model in the converted image.

12. The training processing device of claim 1, wherein the manipulation terminal is connected with the simulation device through a communication network.

13. An intermediation device, comprising the training processing device of claim 1,
- wherein the intermediation device is adapted to mediate between the manipulation terminal and a coaching terminal through a communication network,
- wherein the coaching terminal coaches the training by assisting the robot manipulation inputted into the manipulation terminal, and
- wherein the training processing device is adapted to:
  - cause the coaching terminal to present the first information;
  - accept an assisting command for assisting the robot manipulation inputted into the coaching terminal, to the presented first information; and
  - cause the manipulation terminal to present the assisting command.

14. An intermediation device, comprising the training processing device of claim 1,
- wherein the intermediation device mediates between the manipulation terminal and a simulation device through a communication network.

15. The intermediation device of claim 14, wherein the intermediation device is adapted to mediate between the manipulation terminal, the simulation device, and a coaching terminal through the communication network,
- wherein the coaching terminal coaches the training by assisting the robot manipulation inputted into the manipulation terminal, and
- wherein the training processing device is adapted to:
  - cause the coaching terminal to present the first information;
  - accept an assisting command for assisting the robot manipulation inputted into the coaching terminal, to the presented first information; and
  - cause the manipulation terminal to present the assisting command.

16. A training system, comprising:
- the training processing device of claim 1;
- a coaching terminal configured to coach the training by assisting the robot manipulation inputted into the manipulation terminal; and
- an intermediation device configured to mediate between the manipulation terminal and the coaching terminal through a communication network,
- wherein the training processing device is adapted to:
  - cause the coaching terminal to present the first information;
  - accept an assisting command for assisting the robot manipulation inputted into the coaching terminal, to the presented first information; and
  - cause the manipulation terminal to present the assisting command.

17. The training system of claim 16, further comprising the manipulation terminal.

18. A training system, comprising:
- the training processing device of claim 1; and
- an intermediation device configured to mediate between the manipulation terminal and the simulation device through a communication network.

19. The training system of claim 18, further comprising a coaching terminal configured to coach the training by assisting the robot manipulation inputted into the manipulation terminal,
- wherein the intermediation device mediates between the manipulation terminal, the simulation device, and the coaching terminal through the communication network, and
- wherein the training processing device is adapted to:
  - cause the coaching terminal to present the first information;
  - accept an assisting command for assisting the robot manipulation inputted into the coaching terminal, to the presented first information; and
  - cause the manipulation terminal to present the assisting command.

20. The training system of claim 18, further comprising the manipulation terminal.

* * * * *